(12) United States Patent
Ishiwaka et al.

(10) Patent No.: US 12,382,936 B2
(45) Date of Patent: Aug. 12, 2025

(54) INFORMATION PROCESSING APPARATUS AND INFORMATION PROCESSING METHOD

(71) Applicants: SoftBank Corp., Tokyo (JP); NeuralX Inc., Los Angeles, CA (US)

(72) Inventors: Yuko Ishiwaka, Tokyo (JP); Masaki Nakada, Los Angeles, CA (US)

(73) Assignees: SOFTBANK CORP., Tokyo (JP); NEURALX INC., Los Angeles, CA (US)

( * ) Notice: Subject to any disclaimer, the term of this patent is extended or adjusted under 35 U.S.C. 154(b) by 464 days.

(21) Appl. No.: 17/875,426

(22) Filed: Jul. 28, 2022

(65) Prior Publication Data
US 2024/0041009 A1 Feb. 8, 2024

(51) Int. Cl.
*A01K 61/95* (2017.01)
*A01K 61/10* (2017.01)

(52) U.S. Cl.
CPC .............. *A01K 61/95* (2017.01); *A01K 61/10* (2017.01); *A01K 2227/40* (2013.01)

(58) Field of Classification Search
CPC ..... A01K 61/95; A01K 61/10; A01K 2227/40
See application file for complete search history.

(56) References Cited

U.S. PATENT DOCUMENTS

| | | | |
|---|---|---|---|
| 2009/0220922 A1* | 9/2009 | Lee .................... | G09B 19/003 434/6 |
| 2020/0113158 A1* | 4/2020 | Rishi .................. | G06T 7/20 |
| 2021/0329891 A1* | 10/2021 | Kozachenok .......... | A01K 61/95 |

FOREIGN PATENT DOCUMENTS

| | | | | |
|---|---|---|---|---|
| CN | 113421345 A | | 9/2021 | |
| CN | 113421345 B | * | 10/2023 | ............. G06N 3/006 |
| WO | 2019/045091 A1 | | 3/2019 | |

OTHER PUBLICATIONS

International Search Report and Written Opinion of the International Searching Authority issued Aug. 29, 2023 in corresponding International Patent Application No. PCT/JP2023/027882 (English translation only), 8 pages.

(Continued)

*Primary Examiner* — Charles Cai
(74) *Attorney, Agent, or Firm* — XSENSUS LLP

(57) ABSTRACT

An information processing apparatus according to the present application includes: an acquisition unit configured to acquire individual information indicating a characteristic of behavior of an individual belonging to a group of living organisms to be processed arranged in a virtual space, relative information indicating a characteristic of the behavior relative to the individuals of other individuals located around the individual belonging to the group of living organisms to be processed with respect to the individual, and environmental information indicating a characteristic of an environment around the individual belonging to the group of living organisms to be processed; and a determination unit configured to determine a behavior of an individual belonging to the group of living organisms to be processed on the basis of the individual information, the relative information, and the environmental information acquired by the acquisition unit.

10 Claims, 22 Drawing Sheets

(56) References Cited

OTHER PUBLICATIONS

Ishiwaka, Yuko et al., "Foids: Bio-Inspired Fish Simulation for Generating Synthetic Datasets", [online], Dec. 2021, <URL: https://dl.acm.org/doi/10.1145/3478513.3480520>, [retrieved on Aug. 15, 2023].

Ishiwaka, Yuko et al., DeepFoids: Adaptive Bio-Inspired Fish Simulation with Deep Reinforcement Learning, [online], Nov. 28, 2022, <URL: https://openreview.net/pdf?id=9T0Bnap5-j>, [retrieved on Aug. 15, 2023].

Japanese Office Action issued Oct. 1, 2024 in corresponding Japanese Patent Application No. 2023-562522, 6 pages.

\* cited by examiner

FIG.3
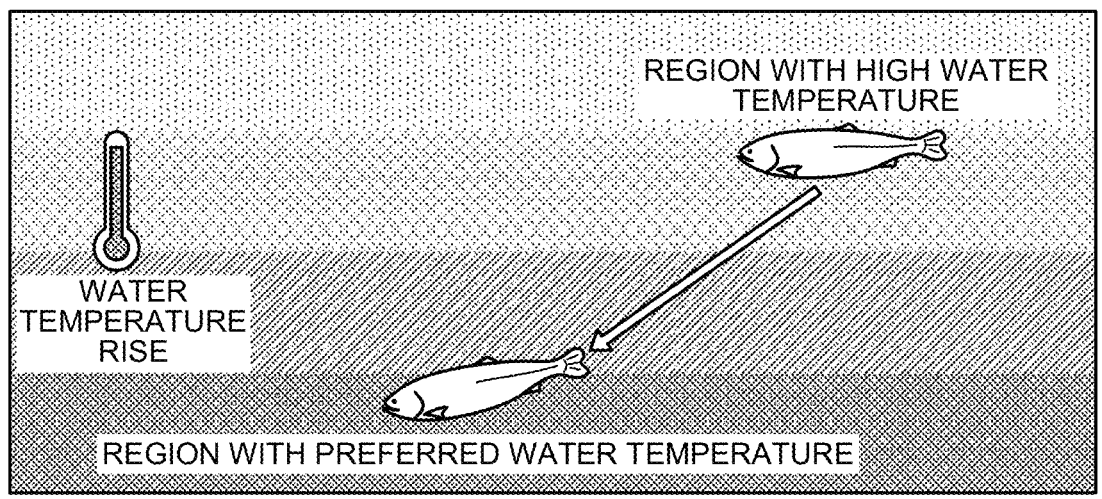
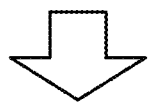
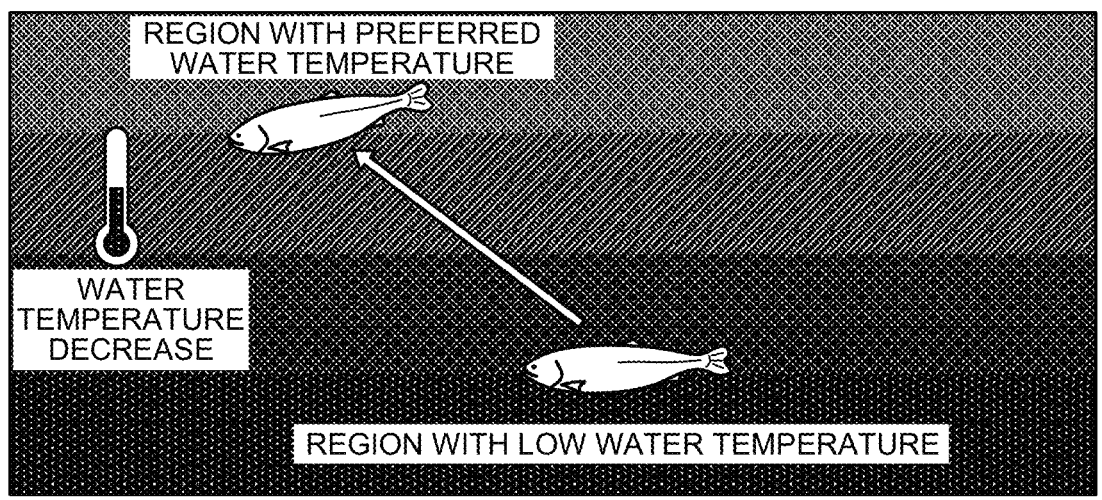

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

Deep learning has produced excellent results in the fields of computer vision and voice recognition. For example, in a fish farm, counting of the number of fish in a herd in a cage is a problem, but it is expected that such a problem will be improved by using a deep learning method.
Patent Literature 1: WO 2019/045091 A Meanwhile, the accuracy of analysis by deep learning depends on training data. That is, in order to obtain a highly accurate analysis result, it is necessary to cause the machine learning model to learn a large amount of training data covering various patterns. For example, in order to accurately estimate information (for example, the number of fish) on a herd of fish from a captured image obtained by capturing a herd of fish in a cage using computer vision, it is necessary to cause a machine learning model to learn a large amount of training data covering combinations of various conditions such as an environment around the fish, a fish species, and the number of fish.

However, it is not easy to create a large amount of training data covering various patterns. For example, it is very difficult to create a large amount of training data by manually assigning correct answer data to each of a huge number of images covering combinations of various conditions.

As described above, in a case where a large amount of training data covering various patterns cannot be obtained, it is not possible to cause the machine learning model to perform high-quality learning, and thus, it may be difficult to accurately estimate information regarding a herd of fish from an actual captured image.

In addition, in order to solve the above problem, a technique using a simulation image obtained by capturing a herd of fish located in a three-dimensional simulation space with a virtual camera as training data instead of a captured image obtained by capturing a herd of fish existing in a three-dimensional space (for example, in the cage) is known. However, there is room for improvement in a technique for generating a group behavior of fish included in a simulation image.

Therefore, an object of the present disclosure is to provide an information processing apparatus and an information processing method capable of automatically generating a group behavior of living organisms.

SUMMARY OF THE INVENTION

It is an object of the present invention to at least partially solve the problems in the conventional technology.

According to one aspect of an embodiment, an information processing apparatus according to the present application includes: an acquisition unit configured to acquire individual information indicating a characteristic of behavior of an individual belonging to a group of living organisms to be processed arranged in a virtual space, relative information indicating a characteristic of the behavior relative to the individuals of other individuals located around the individual belonging to the group of living organisms to be processed with respect to the individual, and environmental information indicating a characteristic of an environment around the individual belonging to the group of living organisms to be processed; and a determination unit configured to determine a behavior of an individual belonging to the group of living organisms to be processed on the basis of the individual information, the relative information, and the environmental information acquired by the acquisition unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram for explaining a relationship between a water temperature and a behavior of fish;

DETAILED DESCRIPTION OF THE PREFERRED EMBODIMENTS

Figure 1:
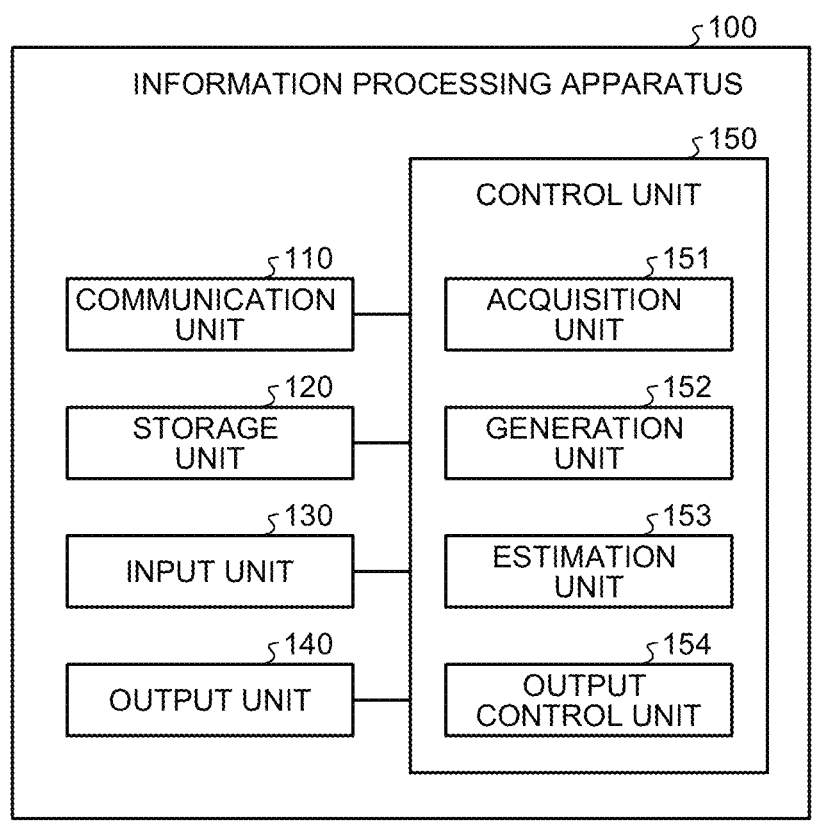
FIG. 1 is a diagram illustrating a configuration example of an information processing apparatus according to a first embodiment.

Hereinafter, modes (hereinafter referred to as "embodiment") for implementing an information processing method, an information processing program, and an information processing apparatus according to the present application will be described in detail with reference to the drawings. Note that the information processing method, the information processing program, and the information processing apparatus according to the present application are not limited by the embodiment. In the following embodiments, the same parts are denoted by the same reference numerals, and redundant description will be omitted.

1. First Embodiment

1-1. Introduction

In recent years, fish farming has attracted attention as a means to solve the global food problem. In order to supply high quality fish by fish farming, it is important to accurately know the number of fish deeply associated with feeding (feeding of fish).

However, in a special environment such as underwater in a fish farm, it may be difficult to utilize the IT technology on the ground. Therefore, conventionally, a person scoops up some fish with a net and measures the fish, and then visually counts the number of fish. This method has problems such as a heavy burden on fish and lack of accuracy.

Therefore, in recent years, a method of automatically counting the number of fish in a herd from a captured image obtained by capturing the fish in the cage using computer vision has attracted attention. A specific example is a method of learning a machine learning model for image recognition so as to estimate the number of fish in a herd from a captured image. However, in order to accurately estimate the number of fish from the captured image using the machine learning model, it is necessary to cause the machine learning model to learn a large amount of training data covering combinations of various conditions such as the environment around the fish (for example, season, time, weather, water temperature, illuminance, degree of contamination of water, and the like) and the biological characteristics of the fish (for example, fish species, fish size, fish speed, number of fish, and the like).

However, it is not easy to create a large amount of training data covering combinations of various conditions as described above. For example, it is very difficult to create a large amount of training data by manually assigning correct answer data to each of a huge number of images covering combinations of various conditions. In addition, in order to accurately estimate the number of fish from the captured image using the machine learning model, the quality of the training data is also important. However, in a case where the correct answer data is manually assigned, the quality of the training data may not always be high.

For example, a captured image obtained by capturing a herd of fish swimming in a three-dimensional cage may include a region in which a fish (hereinafter, the fish is also referred to as a fish located in the front) located on a side close to the camera and a fish (hereinafter, the fish is also referred to as a fish located at the back) located deeper than the fish overlap. As described above, in the captured image including the region where the fish located in the front and the fish located in the back overlap with each other, since a part of the body of the fish located in the back is hidden, it may be difficult to specify the position of the fish included in the captured image by human eyes. Therefore, for example, in a case where the annotation work surrounding the position of the bounding box fish is manually performed on the captured image including the region where the fish located in the front and the fish located in the back overlap, it may be difficult to add the annotation indicating the accurate position of the fish. In addition, since it is difficult to specify the position of the fish included in the captured image by human eyes, there is a problem that the annotation result varies depending on the worker.

On the other hand, the information processing apparatus according to the first embodiment generates a simulation image that visually displays information indicating the degree of overlap of a plurality of fish in a two-dimensional simulation image obtained by capturing the plurality of fish located in a three-dimensional simulation space with a virtual camera (see FIG. 16 to be described later).

As described above, the information processing apparatus according to the first embodiment uses a simulation image obtained by capturing a herd of fish located in a three-dimensional simulation space with the virtual camera, instead of a captured image obtained by capturing a herd of fish existing in a three-dimensional space (for example, in the cage). As a result, the information processing apparatus can automatically calculate the information indicating the degree of overlap of the plurality of fish in the simulation image. Furthermore, since the information processing apparatus can add the information indicating the degree of overlap of the plurality of fish to the simulation image as an annotation, it is possible to easily generate accurate and high-quality training data. As a result, the information processing apparatus makes it possible to cause a large amount of high-quality training data to be learned for a machine learning model that estimates information regarding a herd of fish (for example, the number of fish) from a captured image, for example. That is, the information processing apparatus can improve the estimation accuracy of the machine learning model for estimating the information regarding the herd of fish (for example, the number of fish) from the captured image, for example, by learning a large amount of high-quality training data. Therefore, the information processing apparatus can accurately estimate information regarding a herd of fish.

1-2. Configuration of Information Processing Apparatus

FIG. 1 is a diagram illustrating a configuration example of an information processing apparatus 100 according to a first embodiment. The information processing apparatus 100 includes a communication unit 110, a storage unit 120, an input unit 130, an output unit 140, and a control unit 150.
Communication Unit 110

The communication unit 110 is realized by, for example, a network interface card (NIC) or the like. Then, the communication unit 110 is connected to the network in a wired or wireless manner, and transmits and receives information to and from, for example, a terminal device used by an administrator who manages fish.

Storage Unit 120

The storage unit 120 is realized by, for example, a semiconductor memory element such as a random access memory (RAM) or a flash memory, or a storage device such as a hard disk or an optical disk. Specifically, the storage unit 120 stores various programs (an example of an information processing program) used for simulation. In addition, the storage unit 120 stores values of various parameters used for simulation.

Figure 2:
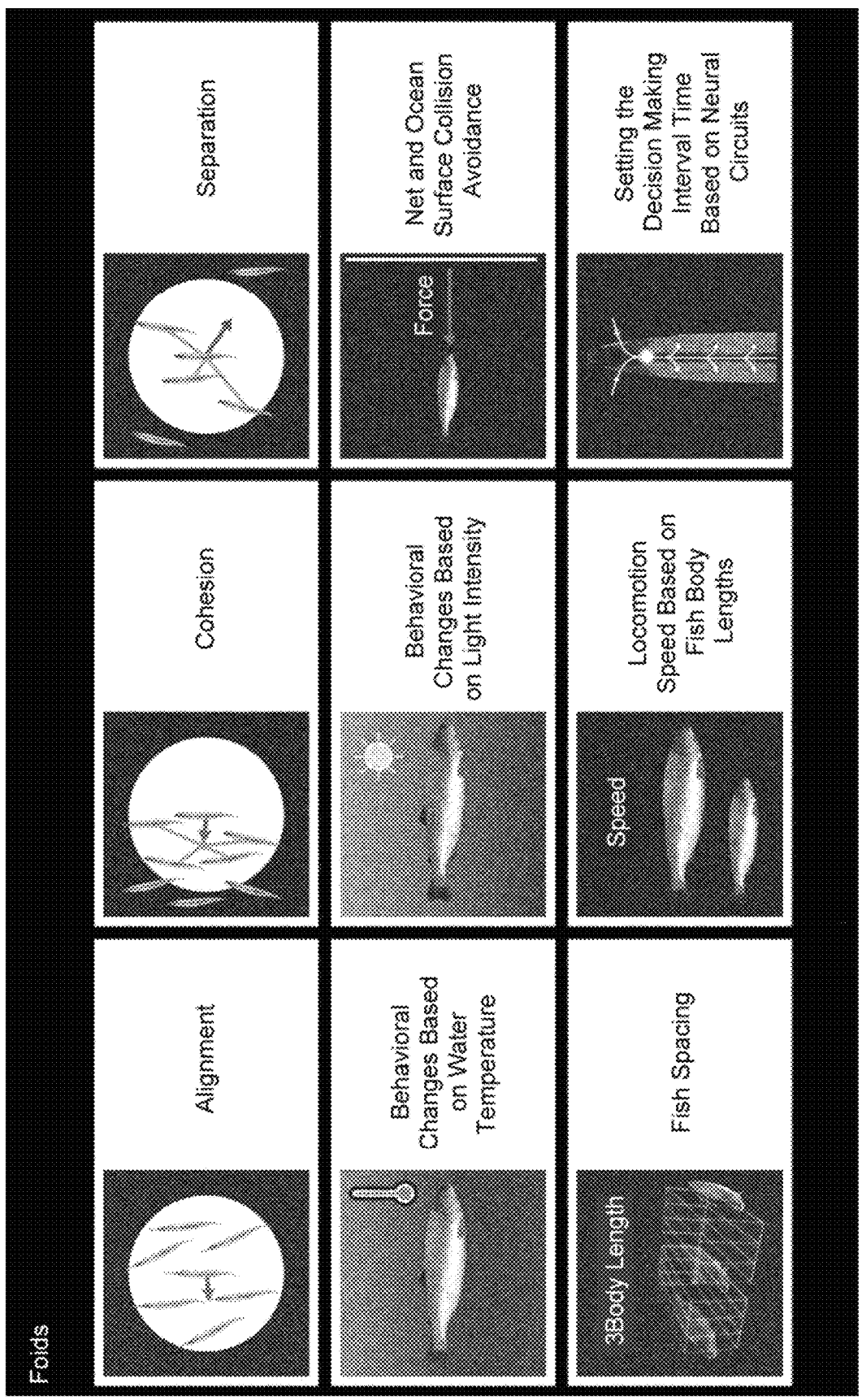
FIG. 2 is a diagram for explaining an overview of nine parameters used for generating a simulation image according to the first embodiment.

FIG. 2 is a diagram for explaining an overview of nine parameters used for generating a simulation image according to the first embodiment. The information processing apparatus according to the first embodiment generates a simulation image including the behavior of each fish belonging to the herd of fish on the basis of the values of the nine parameters illustrated in FIG. 2. The upper part of FIG. 2 illustrates group parameters regarding characteristics (alignment, cohesion, separation) of three types of group behavior. In addition, the middle part of FIG. 2 illustrates external parameters related to the water temperature, the illuminance, the net of the cage, and the like. In addition, the lower part of FIG. 2 illustrates internal parameters such as a range in which the fish takes a group behavior, a relationship between the size of the fish and the moving speed, and the time required for the decision making of the fish. Details of the nine parameters will be described later.

As described above, the information processing apparatus 100 generates the simulation image including the behavior of the herd of fish on the basis of the information regarding the biological characteristics of the fish, the information regarding the environment around the fish, and the information regarding the characteristics of the group behavior of the fish. Thus, it is possible to accurately reproduce the behavior of the herd of fish in the actual cage. Furthermore, the information processing apparatus 100 can easily generate a large number of simulation images covering various patterns by changing the values of a plurality of parameters used for generating the simulation image. Furthermore, since the information processing apparatus 100 can utilize the value of the parameter used to generate the simulation image as the correct answer data, it is possible to easily generate a large amount of high-quality training data as compared with a case where the correct answer data is manually assigned.

As a result, the information processing apparatus 100 makes it possible to cause a large amount of high-quality training data to be learned for a machine learning model that estimates information regarding a herd of fish (for example, the number of fish) from a captured image, for example. That is, the information processing apparatus 100 can improve the estimation accuracy of the machine learning model for estimating the information regarding the herd of fish (for example, the number of fish) from the captured image, for example, by learning a large amount of high-quality training data. Therefore, the information processing apparatus 100 can accurately estimate information regarding a herd of fish.

Input Unit 130

Various operations are input to the input unit 130 from the user. For example, the input unit 130 may receive various operations from the user via the display surface (for example, the output unit 140) by a touch panel function. Furthermore, the input unit 130 may receive various operations from a button provided in the information processing apparatus 100 or a keyboard or a mouse connected to the information processing apparatus 100.

Output Unit 140

The output unit 140 is, for example, a display screen realized by a liquid crystal display, an organic electroluminescence (EL) display, or the like, and is a display device for displaying various types of information. The output unit 140 displays various types of information under the control of the control unit 150. Note that, in a case where a touch panel is adopted as the information processing apparatus 100, the input unit 130 and the output unit 140 are integrated. In the following description, the output unit 140 may be referred to as a screen.

Control Unit 150

The control unit 150 is a controller, and is implemented by, for example, a central processing unit (CPU), a micro processing unit (MPU), or the like executing various programs (corresponding to an example of an information processing program) stored in a storage device inside the information processing apparatus 100 using a RAM as a work area. Furthermore, the control unit 150 is a controller, and is realized by, for example, an integrated circuit such as an application specific integrated circuit (ASIC) or a field programmable gate array (FPGA).

The control unit 150 includes an acquisition unit 151, a generation unit 152, an estimation unit 153, and an output control unit 154 as functional units, and may implement or execute an action of information processing described below. Note that the internal configuration of the control unit 150 is not limited to the configuration illustrated in FIG. 1, and may be another configuration as long as information processing to be described later is performed. Furthermore, each functional unit indicates the function of the control unit 150, and is not necessarily physically distinguished.

Acquisition Unit 151

The acquisition unit 151 acquires a value of an internal parameter related to a biological characteristic of a fish, a value of an external parameter related to a characteristic of an environment around the fish, and a value of a group parameter related to a characteristic of a group behavior that is behavior that the fish takes with respect to other fish. Specifically, the acquisition unit 151 acquires the internal parameter value, the external parameter value, and the group parameter value input by the user via the input unit 130.

More specifically, the acquisition unit 151 acquires the value of the internal parameter set to each fish belonging to the herd of fish included in the simulation image. For example, in a case where the number of fish in a herd included in the simulation image is N (N is a natural number), the acquisition unit 151 acquires values of N internal parameters set for N individual fishes.

In addition, the acquisition unit 151 acquires a value of a group parameter set to a herd of fish included in the simulation image. The value of the group parameter is set to a value common to each fish for each herd of fish. For example, in a case where the number of fish in a herd included in the simulation image is N (N is a natural number), the acquisition unit 151 acquires a value of a group parameter common to all the N individual fishes.

Furthermore, the acquisition unit 151 acquires a value of an external parameter set for each environment around the herd of fish included in the simulation image. For example, the acquisition unit 151 acquires a value of an external parameter set for each cage in which a herd of fish included in the simulation image is located. For example, the acquisition unit 151 acquires the value of the external parameter in which different values are set according to the water depth of the cage in which the herd of fish included in the simulation image is located.

Generation Unit 152

The generation unit 152 generates the simulation image by controlling the behavior of each fish belonging to the herd of fish on the basis of the value of the internal parameter, the value of the external parameter, and the value of the group parameter acquired by the acquisition unit 151. Hereinafter, a case where the generation unit 152 controls the behavior of each fish belonging to the herd of fish on the basis of the value of the internal parameter, the value of the external parameter, and the value of the group parameter will be described in detail with reference to FIGS. 3 to 8.

FIG. 3 is a diagram for explaining a relationship between the water temperature and the behavior of fish. As biological characteristics of fish, it is known that there is a preferred water temperature for each individual fish, and each individual fish moves toward a region with the preferred water temperature. In the example illustrated in the upper part of FIG. 3, since the water temperature around the fish is higher than the water temperature preferred by the fish, the generation unit 152 controls the behavior of the fish so that the fish moves toward the region with the preferred water temperature. In addition, in the example illustrated in the lower part of FIG. 3, since the water temperature around the fish is lower than the water temperature preferred by the fish, the generation unit 152 controls the behavior of the fish so that the fish moves toward the region with the preferred water temperature. For example, the generation unit 152 controls the moving direction of the fish so that the moving direction of the fish is directed toward a region with a desired water temperature. In this manner, the generation unit 152 controls the behavior of each fish so that each fish heads for a region with a preferred water temperature on the basis of the water temperature preferred by each fish belonging to the herd of fish as the value of the internal parameter.

In addition, it is known that the water temperature distribution in the cage varies depending on seasons (alternatively, the tide of the season) and water depths. In the example illustrated in the upper part of FIG. 3, the season is summer, and the water temperature in the cage is high due to the flow of the Kuroshio current into the cage in which the fish is located. In addition, it is known that the water temperature in the cage in the summer season is higher as it is closer to the water surface of the cage and lower as it is closer to the bottom surface of the cage. Therefore, the generation unit 152 changes the distribution of the water temperature in the cage according to the water depth so that the water temperature becomes higher as the position is closer to the water surface of the cage and the water temperature becomes lower as the position is closer to the bottom surface of the cage as the value of the external parameter. In addition, in the example illustrated in the lower part of FIG. 3, the season is winter, and the water temperature in the cage is low due to the flow of the Oyashio current into the cage in which the fish is located. In addition, it is known that the water temperature in a cage in winter is lower as it is closer to the water surface of the cage, and higher as it is closer to the bottom surface of the cage. Therefore, the generation unit 152 changes the distribution of the water temperature in the cage according to the water depth so that the water temperature becomes lower as the position is closer to the water surface of the cage and the water temperature becomes higher as the position is closer to the bottom surface of the cage as the value of the external parameter. As described above, the generation unit 152 controls the behavior of each fish so that each fish heads for a region with a preferred water temperature on the basis of the distribution of the water temperature in the cage in which each fish belonging to the herd of fish is located as the value of the external parameter.

In addition, as biological characteristics of fish, it is known that the higher the water temperature around the fish, the higher the moving speed of the fish, and the lower the water temperature around the fish, the lower the moving speed of the fish. Therefore, the generation unit 152 controls the behavior of each fish such that the higher the water temperature around each fish belonging to the herd of fish, the higher the moving speed of each fish, on the basis of the distribution of the water temperature in the cage in which each fish belonging to the herd of fish is located, as the value of the internal parameter.

Figure 4:
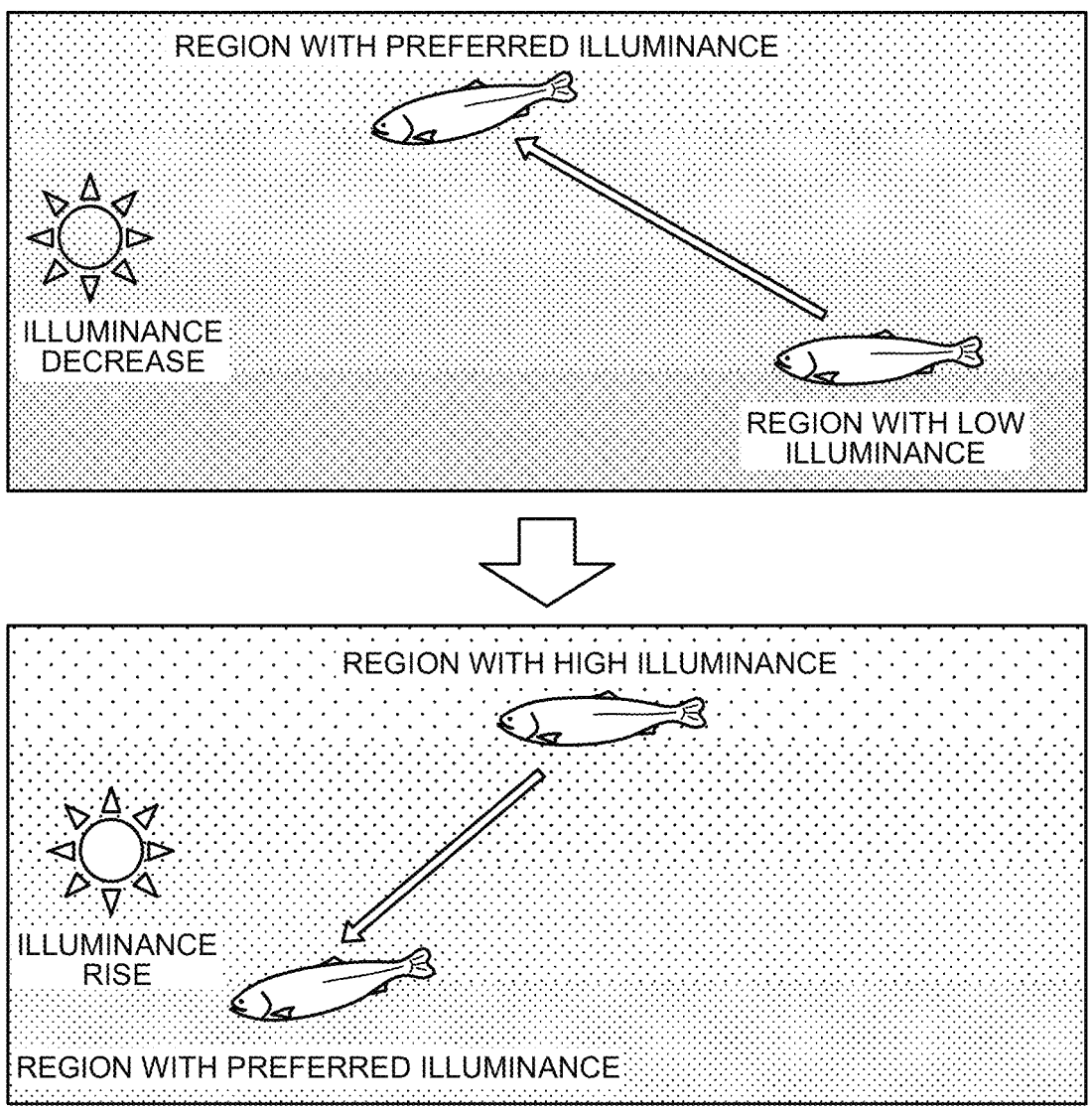
FIG. 4 is a diagram for explaining a relationship between illuminance and a behavior of fish.

FIG. 4 is a diagram for explaining a relationship between illuminance and a behavior of fish. As biological characteristics of fish, it is known that there is a preferred illuminance for each individual fish, and each individual fish moves toward a region with the preferred illuminance. In the example illustrated in the upper part of FIG. 4, since the illuminance around the fish is lower than the illuminance preferred by the fish, the generation unit 152 controls the behavior of the fish so that the fish moves toward the region with the preferred illuminance. Furthermore, in the example illustrated in the lower part of FIG. 4, since the illuminance around the fish is higher than the illuminance preferred by the fish, the generation unit 152 controls the behavior of the fish so that the fish moves toward the region with the preferred illuminance. For example, the generation unit 152 controls the moving direction of the fish so that the moving direction of the fish is directed to a region with a desired illuminance. In this manner, the generation unit 152 controls the behavior of each fish so that each fish moves toward the region with the preferred illuminance on the basis of the illuminance preferred by each fish belonging to the herd of fish as the value of the internal parameter.

It is also known that the distribution of illuminance in a cage varies depending on seasons, times, weather, and water depths. In the example illustrated in the upper part of FIG. 4, the season is winter (alternatively, the time is morning, night, or the like), and the illuminance in the cage is low. In the example illustrated in the lower part of FIG. 4, the season is summer (alternatively, the time is daytime, or the like), and the illuminance in the cage is high. In general, it is known that the illuminance in the cage is higher as it is closer to the water surface of the cage and lower as it is closer to the bottom surface of the cage. Therefore, the generation unit 152 changes the distribution of the illuminance in the cage according to the water depth so that the illuminance becomes higher as the position is closer to the water surface of the cage and the illuminance becomes lower as the position is closer to the bottom surface of the cage as the value of the external parameter. In this manner, the generation unit 152 controls the behavior of each fish so that each fish moves toward a region with desired illuminance on the basis of the distribution of illuminance in the cage in which each fish belonging to the herd of fish is located as the value of the external parameter.

Figure 5:
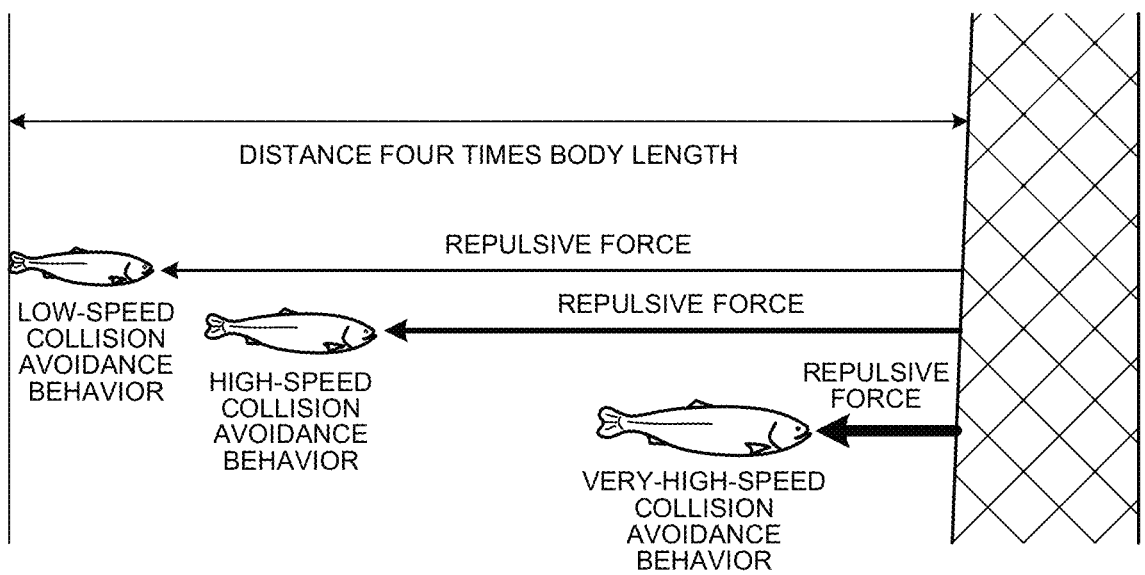
FIG. 5 is a diagram for explaining a relationship between a net in a cage and a behavior of fish.

FIG. 5 is a diagram for explaining a relationship between a net in a cage and a behavior of fish. As a biological characteristic of fish, it is known that when a fish approaches an obstacle such as a net in a cage or a water surface in a cage, the fish takes an avoidance behavior of avoiding the obstacle. The inventors of the present invention have obtained an experimental result that when the distance between a fish and an obstacle is four times or less the body length of the fish, the fish detects the obstacle and the fish takes an avoidance behavior of avoiding the obstacle. Therefore, in a case where the distance between each fish belonging to the herd of fish and the obstacle is equal to or less than a predetermined threshold value (for example, a length of a predetermined multiple of the body length of each fish) as the value of the internal parameter, the generation unit 152 controls the behavior of each fish so that each fish takes an avoidance behavior of avoiding the obstacle.

In addition, as illustrated in FIG. 5, it is known that, as a biological characteristic of fish, the fish takes a faster (slower) collision avoidance behavior as the distance between the fish and the net in the cage is shorter (as the distance is longer). Therefore, the generation unit 152 controls the behavior of each fish on the basis of the repulsive force that becomes larger as the distance between each fish belonging to the herd of fish and the obstacle is smaller. Here, the repulsive force refers to a force by which the fish tries to move away from the obstacle to avoid collision with the obstacle. For example, in a case where the distance between the fish and the obstacle is equal to or less than a predetermined threshold value, the generation unit 152 controls the behavior of the fish on the basis of a repulsive force having a magnitude proportional to the distance between the fish and the obstacle. For example, the generation unit 152 controls the behavior of the fish so that the fish avoids an obstacle (in FIG. 5, a net of a cage is illustrated) by causing a repulsive force in a direction opposite to the moving direction of the fish (in FIG. 5, the direction in which the fish heads towards the net of the cage) to act on the fish. As described above, in a case where the distance between each fish belonging to the herd of fish and the obstacle is equal to or less than the predetermined threshold value as the value of the internal parameter, the generation unit 152 controls the behavior of each fish on the basis of the repulsive force acting on each fish.

Figure 6:
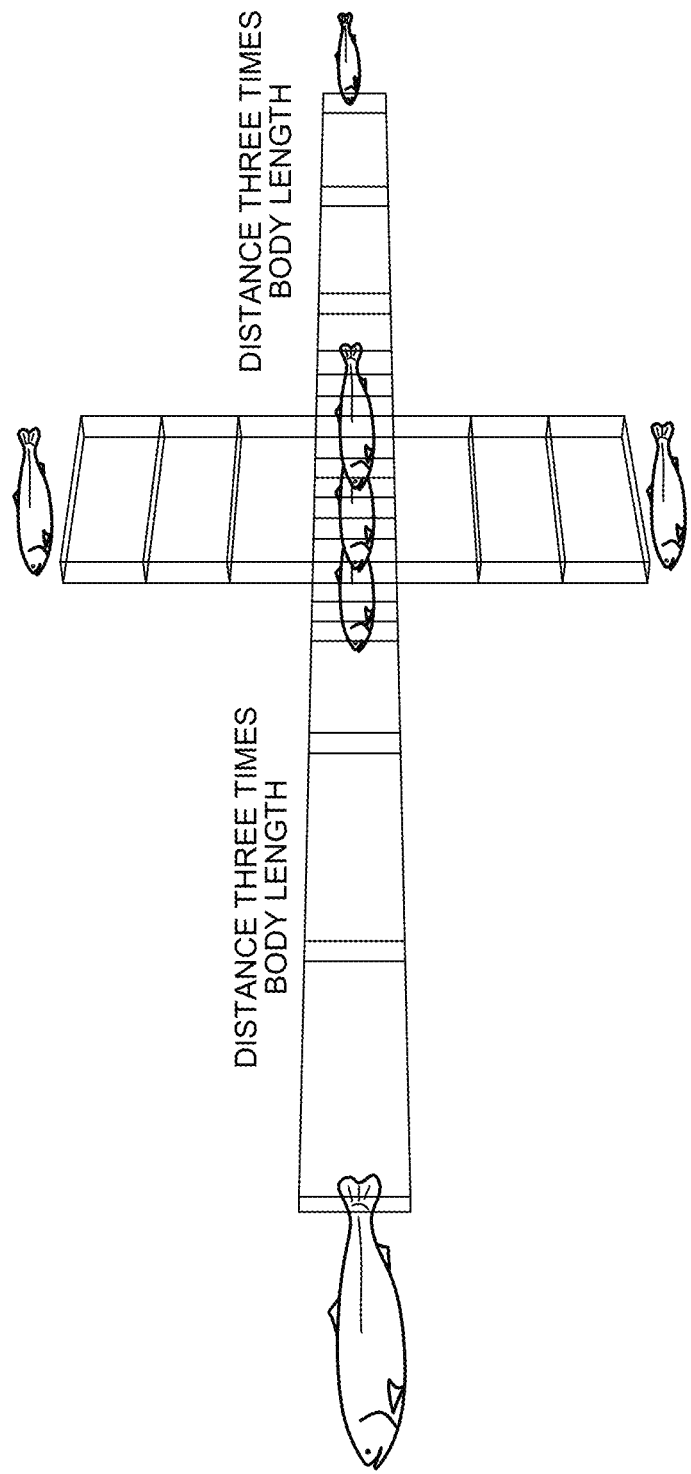
FIG. 6 is a diagram for explaining a range in which fish take a group behavior with respect to other fish.

FIG. 6 is a diagram for explaining a range in which fish take a group behavior with respect to other fish. As a biological characteristic of fish, it is known that fish take a group behavior with respect to other fish located around themselves. The inventors of the present invention have obtained an experimental result in which a fish detects other fish located within a range of a distance three times its own body length and takes a group behavior on other fish located within a range of a distance three times its own body length. Therefore, in a case where another fish is located within a predetermined range (for example, within a range of a distance of a predetermined multiple of the body length of each fish) from the position of each fish belonging to the herd of fish as the value of the group parameter, the generation unit 152 controls the behavior of each fish so that each fish takes a group behavior.

Here, the group behavior of fish with respect to other fish refers to behavior following three rules of cohesion, separation, and alignment. "Cohesion" refers to a force with which individuals try to approach each other so as not to be separated (hereinafter, also referred to as cohesion force), "separation" refers to a force with which individuals try to separate from each other to avoid collision (hereinafter, also referred to as a separation force), and "alignment" refers to a force with which individuals try to align directions of movement as a group (hereinafter, also referred to as alignment force). The behavior of the fish is determined by the sum of these three forces. Hereinafter, the three forces of the cohesion force, the separation force, and the alignment force are collectively referred to as "group parameters". The three forces are each determined by the values of the parameters indicating the magnitude of the force, the direction of the force, and the extent to which the force spans. For example, the group parameter is determined by the size of the space in which the herd is located (for example, a cage), the size of the fish, and the concentration of the herd of fish. In this manner, the generation unit 152 controls the behavior of each fish on the basis of, as the value of the group parameter, a cohesion force that is a force with which each fish belonging to the herd of fish approaches each other so as not to be separated, a separation force that is a force with which each fish belonging to the herd of fish tries to separate from each other to avoid collision, and an alignment force that is a force with which each fish belonging to the herd of fish tries to align a direction in which each fish moves as a group.

Figure 7:
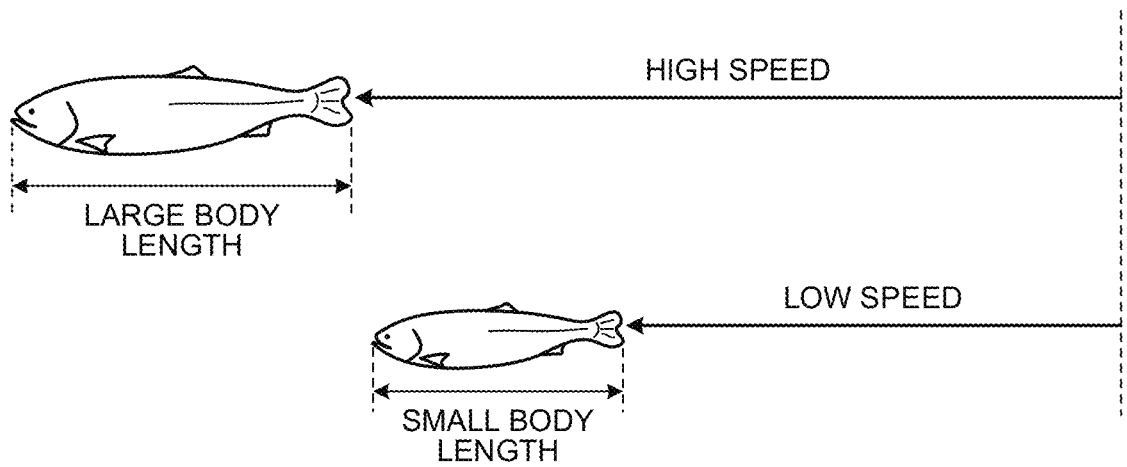
FIG. 7 is a diagram for explaining a relationship between the body length of a fish and the speed of the fish.

FIG. 7 is a diagram for explaining a relationship between the body length of a fish and the speed of the fish. As a biological characteristic of fish, it is known that the larger (smaller) the body length of fish, the larger (smaller) the moving speed of fish. Therefore, the generation unit 152 controls the behavior of each fish such that the moving speed of each fish increases as the body length increases on the basis of the body length of each fish belonging to the herd of fish as the value of the internal parameter. In addition, as a biological characteristic of fish, it is known that the larger (smaller) the amplitude of the caudal fin of fish, the larger (smaller) the moving speed of fish. Therefore, on the basis of the magnitude of the amplitude of the caudal fin of each fish belonging to the herd of fish as the value of the internal parameter, the generation unit 152 may control the behavior of each fish so that the larger the magnitude of the amplitude, the larger the moving speed of each fish.

Figure 8:
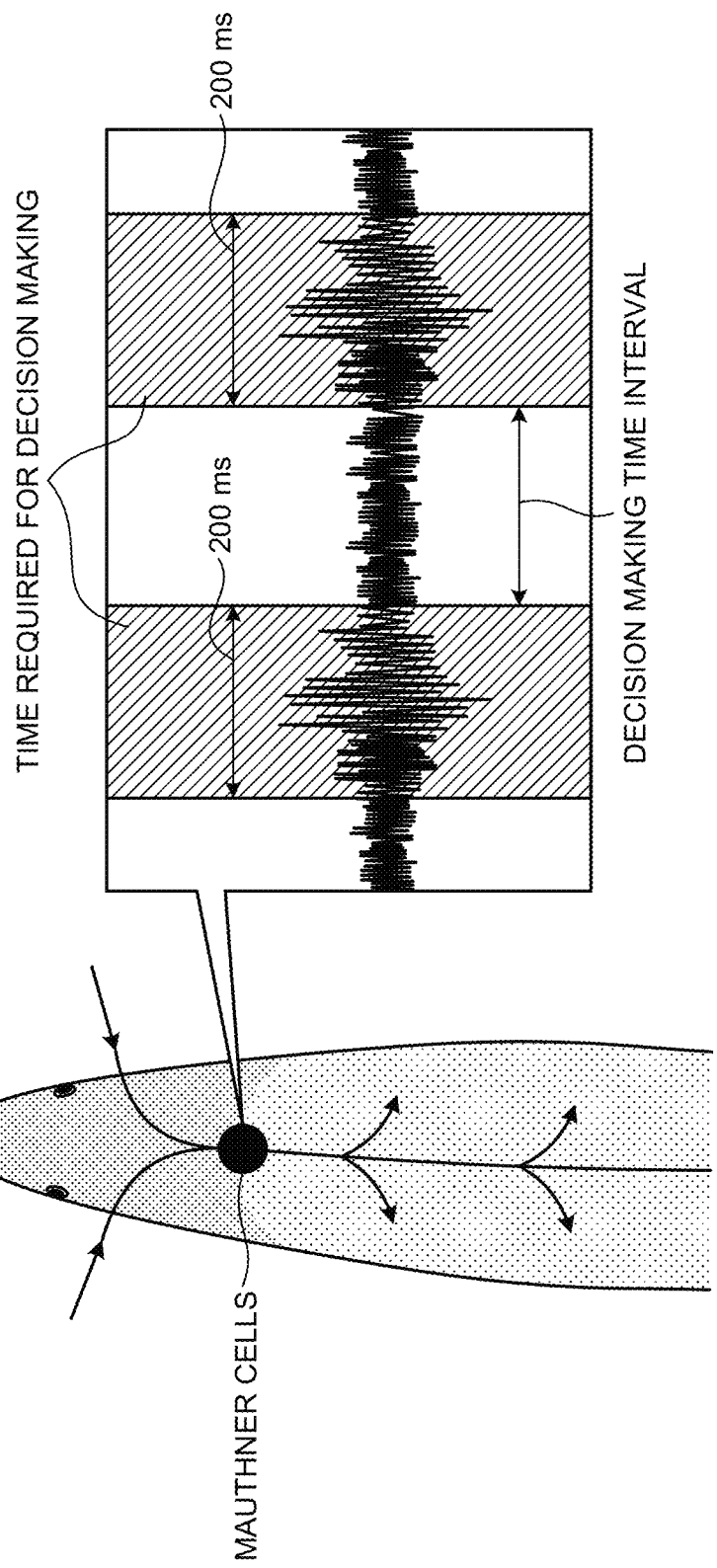
FIG. 8 is a diagram for explaining the relationship between the reaction rate of Mauthner cells of fish and the length of time and the time interval required for decision making by fish.

FIG. 8 is a diagram for explaining the relationship between the reaction rate of the Mauthner cells of fish and the length of time and the time interval required for decision making of fish. As a biological characteristic of fish, it is known that the time required for the fish to make a decision to take each behavior is determined by the reaction rate of the fish's Mauthner cells (a kind of nerve cells). Here, the decision making in which the fish takes each behavior refers to a decision making in which the fish instantaneously decides "where to swim" and "how to swim". In the example illustrated in FIG. 8, the time required for the fish to make a decision to take each behavior is about 200 milliseconds, and the decision making time interval is several hundred milliseconds. Therefore, the generation unit 152 controls the behavior of each fish on the basis of the length of time and the interval of time required for each fish belonging to the herd of fish to make a decision to take each behavior as the value of the internal parameter. Specifically, the generation unit 152 sets the update time of the simulation image to the time (for example, several hundred milliseconds) required for the fish to make a decision to take each behavior. For example, the generation unit 152 controls the length of time during which the fish takes a predetermined state (for example, a state of "Slow Swim" illustrated in FIG. 11 to be described later) to be the time (for example, several hundred milliseconds) required for the fish to make a decision to take each behavior. Subsequently, the generation unit 152 controls a time interval at which the fish transitions from a predetermined state (for example, a state of "Slow Swim" illustrated in FIG. 11 to be described later) to another state (for example, a state of "C-start Left" illustrated in FIG. 11 to be described later) to a decision making time interval (for example, several hundred milliseconds). Subsequently, the generation unit 152 controls the length of time during which the fish takes another state (for example, a state of "C-start Left" illustrated in FIG. 11 to be described later) to be the time required for the fish to make a decision to take each behavior (for example, several hundred milliseconds).

In addition, as a biological characteristic of fish, it is known that the lower (higher) the water temperature around the fish (or the body temperature of the fish), the slower (faster) the reaction rate of the Mauthner cells of the fish. Therefore, the generation unit 152 may control the behavior of each fish on the basis of the length of time and the time interval required for decision making that becomes longer as the water temperature around the fish is lower as the value of the internal parameter.

Figure 9:
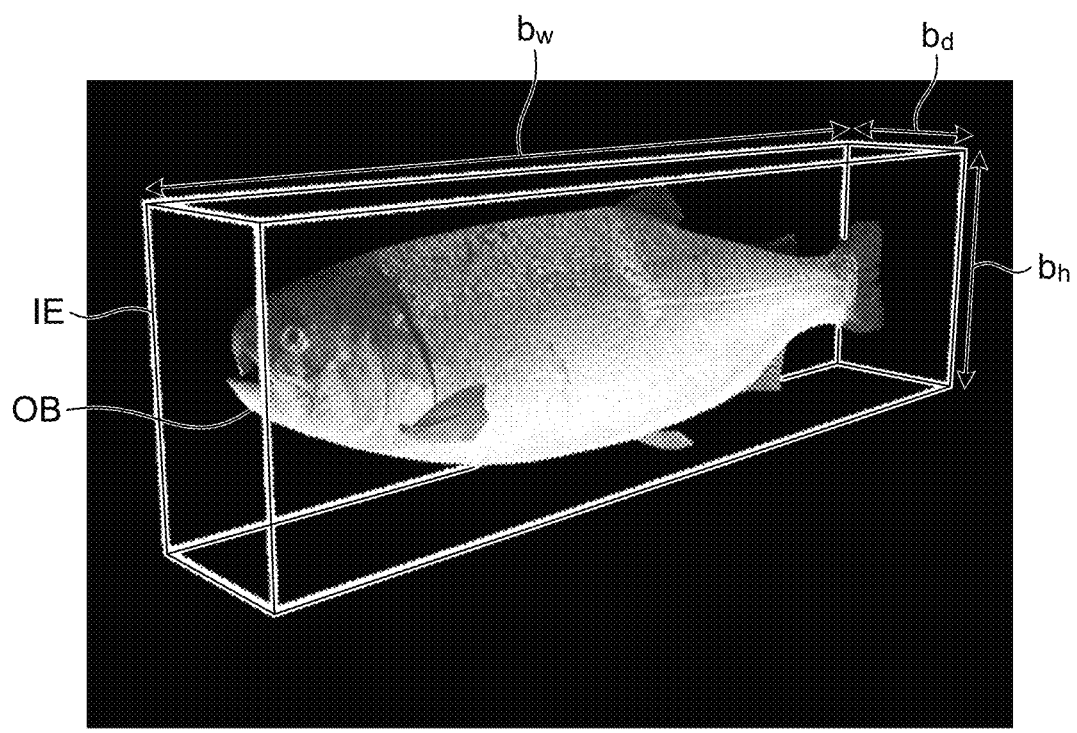
FIG. 9 is a diagram illustrating a three-dimensional CG image of fish and a three-dimensional bounding box.

FIG. 9 is a diagram illustrating a three-dimensional CG image of fish and a three-dimensional bounding box. The fish illustrated in FIG. 9 is a three-dimensional CG image of fish generated on the basis of body-side data (hereinafter, it is also referred to as actual data of the cage) actually measured for each fish species. The generation unit 152 generates a simulation image using a real three-dimensional CG image of a fish generated on the basis of the actual data of the cage. Note that the generation unit 152 may generate the simulation image using a three-dimensional CG image of a fish that is not based on the actual data of the cage. For example, the generation unit 152 may generate the simulation image using the three-dimensional CG image of the fish having the body-side data different from the actual data of the cage on the basis of the peripheral value (for example, a value within a predetermined range from the representative value of the actual measurement data, or the like) of the actual data of the cage. In addition, the generation unit 152 may vary the body length, the moving speed, the initial position, the initial state, the weight, and the like of each fish belonging to the herd of fish included in the simulation image.

In addition, the frame surrounding the fish illustrated in FIG. 9 is a three-dimensional bounding box for specifying the position information and the size of the fish. The generation unit 152 generates position information of each fish. For example, the generation unit 152 includes position information indicating a center position of a fish OB and an existence range of the fish OB. The position information of the fish is generated using, for example, three-dimensional coordinate information. In the example of FIG. 9, as an example of the position information of the fish OB, the generation unit 152 generates information regarding coordinates ($b_x$, $b_y$, $b_z$) of the center of the fish OB (not illustrated), and the depth $b_d$, the width $b_w$, and the height $b_h$ of a rectangular parallelepiped (three-dimensional bounding box) having the minimum size enclosing the fish OB.

Figure 10:
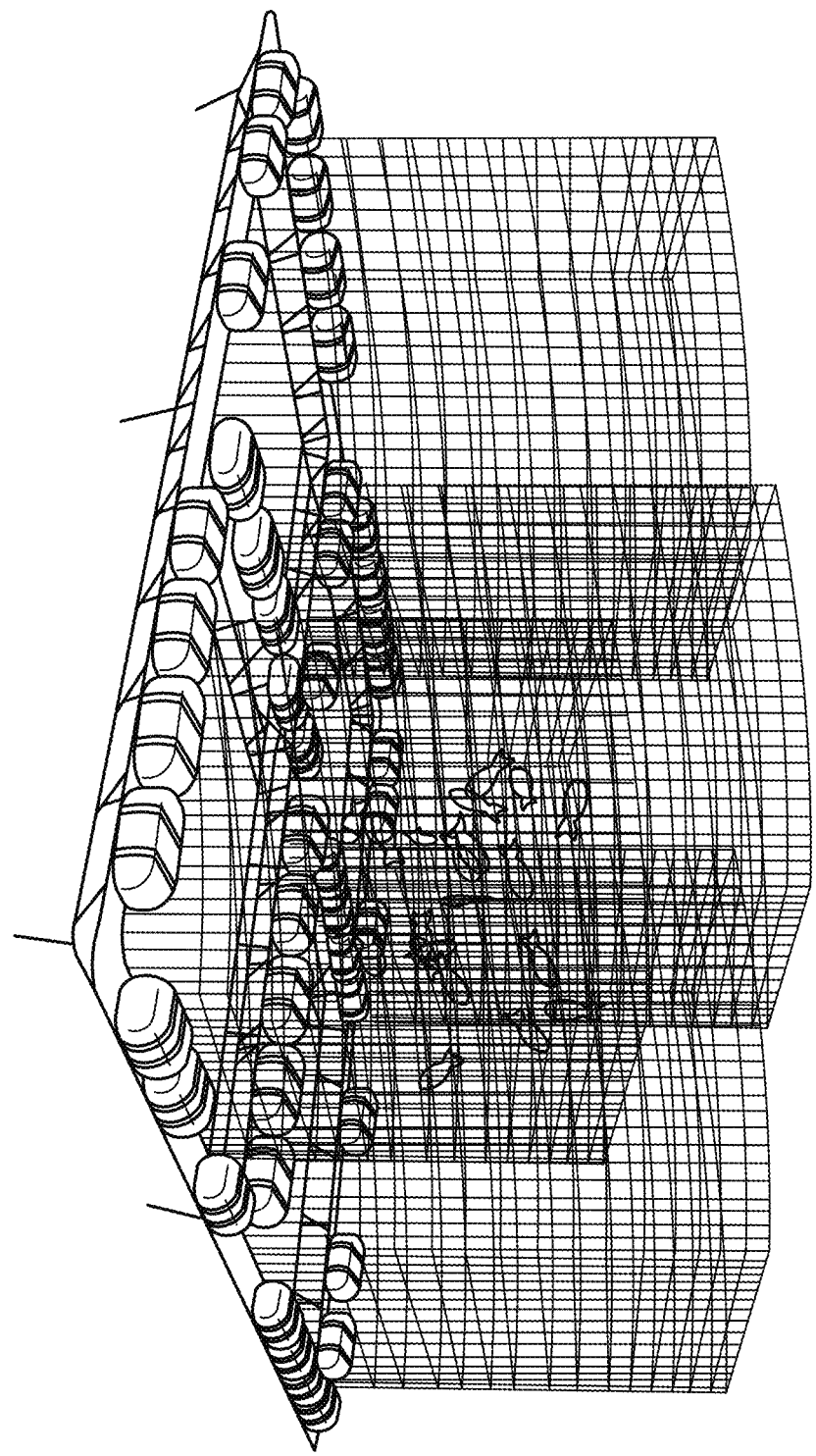
FIG. 10 is a diagram illustrating a three-dimensional CG image of a fish cage.

FIG. 10 is a diagram illustrating a three-dimensional CG image of a fish cage. FIG. 10 is a three-dimensional CG image of the cage generated based on latitude and longitude, water temperature, illuminance, underwater image data, and the like (hereinafter, it is also referred to as actual data of the cage) of the existing cage. The generation unit 152 generates a simulation image using a real three-dimensional CG image of the cage generated on the basis of the actual data of the cage. Note that the generation unit 152 may generate the simulation image using the three-dimensional CG image of the cage that is not based on the actual data of the cage. For example, the generation unit 152 may generate the simulation image using the three-dimensional CG image of the cage having data different from the actual data of the cage (for example, the size, depth, water temperature, illuminance, and the like of the cage are values within a predetermined range from the representative value of the actual measurement data) on the basis of the peripheral value (for example, a value within a predetermined range from the representative value of the actual measurement data, or the like) of the actual data of the cage. In addition, the generation unit 152 may generate the simulation image using the three-dimensional CG image of the cage having data different from the actual data of the cage on the basis of a value (for example, data in a time zone in which actual measurement data does not exist, and the like) not present in the actual data.

Figure 11:
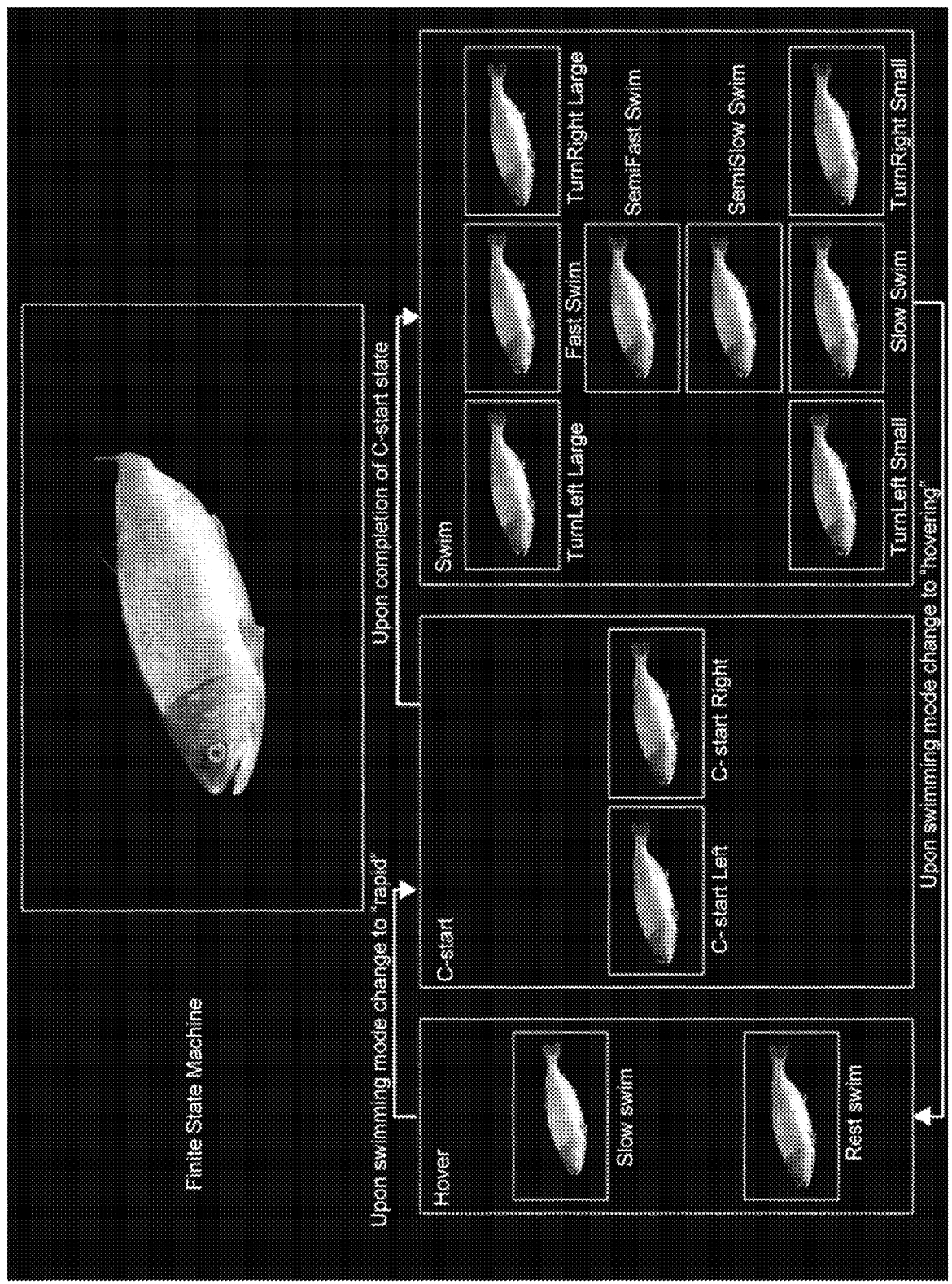
FIG. 11 is a diagram illustrating a finite state machine that determines a state of a fish.

FIG. 11 is a diagram illustrating a finite state machine for determining a state of a fish. As a biological characteristic of fish, it is known that a fish swimming style (it is also referred to as swimming stroke or swimming) can be classified into a specific pattern for each fish species. Note that, in FIG. 11, a case where the fish species is salmon will be described, but the swimming pattern may be different for each fish species. The generation unit 152 generates twelve types of animations indicating the swimming states of twelve types of fish as illustrated in FIG. 11. Furthermore, the generation unit 152 determines the swimming state of each fish by a finite state machine (FSM) from among twelve types of animations, thereby transitioning the swimming state of each fish.

For example, the generation unit 152 causes the swimming of the fish to transition from the state of "Slow Swim" to the state of "C-start Left". Subsequently, the generation unit 152 causes the swimming of the fish to transition from the state of "C-start Left" to the state of "Fast Swim". Subsequently, the generation unit 152 causes the swimming of the fish to transition from the state of "Fast Swim" to the state of "Semi Fast Swim". Subsequently, the generation unit 152 causes the swimming of the fish to transition from the state of "Semi Fast Swim" to the state of "Slow Swim". Subsequently, the generation unit 152 causes the swimming of the fish to transition from the state of "Slow Swim" to the state of "Rest Swim". Furthermore, at the time of state transition, the generation unit 152 can realize smooth animation by complementing between the state before transition and the state after transition.

In addition, the generation unit 152 controls the behavior of the three-dimensional CG of fish so that the three-dimensional CG of real fish (see FIG. 9) swim in a three-dimensional simulation space (see FIG. 10) that reproduces a real cage on the basis of the value of the internal parameter, the value of the external parameter, and the value of the group parameter acquired by the acquisition unit 151, thereby realizing a three-dimensional simulation that looks exactly like a herd of fish swimming in the cage. Subsequently, the generation unit 152 generates a simulation image by capturing a three-dimensional simulation resembling a herd of fish swimming in the cage with a virtual camera installed at a position of a predetermined depth from the water surface of the three-dimensional simulation space reproducing the cage.

Furthermore, after generating the simulation image, the generation unit 152 may generate training data to which a two-dimensional bounding box indicating position information of each fish included in the generated simulation image is added. Note that the generation unit 152 can easily generate the training data to which the two-dimensional bounding box is added by using the position information of each fish used when the simulation image is generated.

Furthermore, after generating the simulation image, the generation unit 152 may generate training data to which a three-dimensional bounding box indicating position information of each fish included in the generated simulation image is added. Note that the generation unit 152 can easily generate the training data to which the three-dimensional bounding box is added by using the position information of each fish used when the simulation image is generated.

In addition, when generating the simulation image, the generation unit 152 may generate training data in which each fish included in the generated simulation image is replaced with a silhouette. For example, the generation unit 152 generates training data in which each fish replaced with a silhouette is color-coded and displayed. Note that color coding corresponds to assignment of color elements. For example, in a case where there are a plurality of fish, the generation unit 152 may vary the color to be color-coded for each fish, or may vary the color according to the classification information of the fish.

In the above-described example, the case where the generation unit 152 generates the simulation image including the behavior of each fish belonging to the herd of fish on the basis of the value of the internal parameter regarding the biological characteristic of the fish, the value of the external parameter regarding the characteristic of the environment around the fish, and the value of the group parameter regarding the characteristic of the group behavior that is the behavior of the fish with respect to other fish has been described, but the type of the parameter is not limited thereto. In FIGS. 12 to 15, a case where the generation unit 152 generates a simulation image on the basis of a value of a color parameter regarding a characteristic of water color in water in which a fish is located, in addition to the internal parameter, the external parameter, and the group parameter described above will be described. Specifically, the acquisition unit 151 acquires the value of the internal parameter, the value of the external parameter, the value of the group parameter, and the value of the color parameter. Specifically, the acquisition unit 151 acquires the value of the internal parameter, the value of the external parameter, the value of the group parameter, and the value of the color parameter input by the user via the input unit 130. The generation unit 152 generates a simulation image including the behavior of each fish belonging to the herd of fish on the basis of the value of the internal parameter, the value of the external parameter, the value of the group parameter, and the value of the color parameter acquired by the acquisition unit 151.

Figure 12:
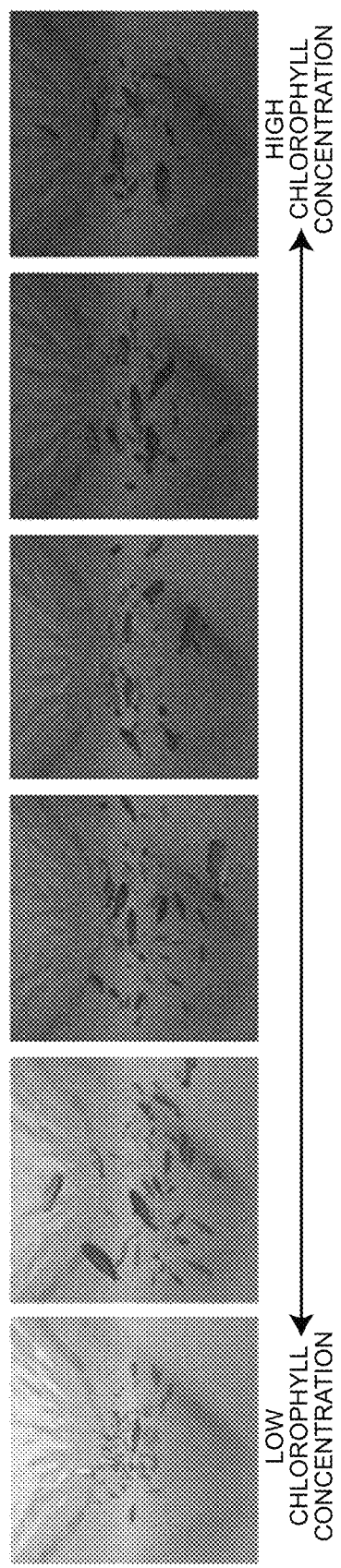
FIG. 12 is a diagram illustrating an example of a simulation image in which a parameter indicating a concentration of chlorophyll is changed according to the first embodiment.

FIG. 12 is a diagram illustrating an example of a simulation image in which a parameter indicating a concentration of chlorophyll is changed according to the first embodiment. The six images illustrated in FIG. 12 are simulation images in which the chlorophyll concentration is lower toward the left and the chlorophyll concentration is higher toward the right. Chlorophyll is a green pigment contained in phytoplankton and algae existing in water. In general, it is known that chlorophyll in water is likely to absorb light having a wavelength corresponding to blue (hereinafter, also referred to as blue light). Therefore, as the concentration of chlorophyll in water is higher, blue light is more easily attenuated, and therefore it is known that water having a high concentration of chlorophyll looks reddish. Chlorophyll causes turbidity of water. Therefore, it is known that water having a high chlorophyll concentration looks reddish and turbid, and as a result, looks reddish brown. Therefore, the generation unit 152 generates the simulation image on the basis of the concentration of chlorophyll in the water in the cage in which each fish belonging to the herd of fish is present as the value of the color parameter. Specifically, the generation unit 152 controls the RGB value in each pixel of the simulation image such that the luminance value of B (blue) among the RGB values in each pixel of the simulation image becomes smaller as the concentration of chlorophyll in the water in the cage is higher, and generates the simulation image.

Figure 13:
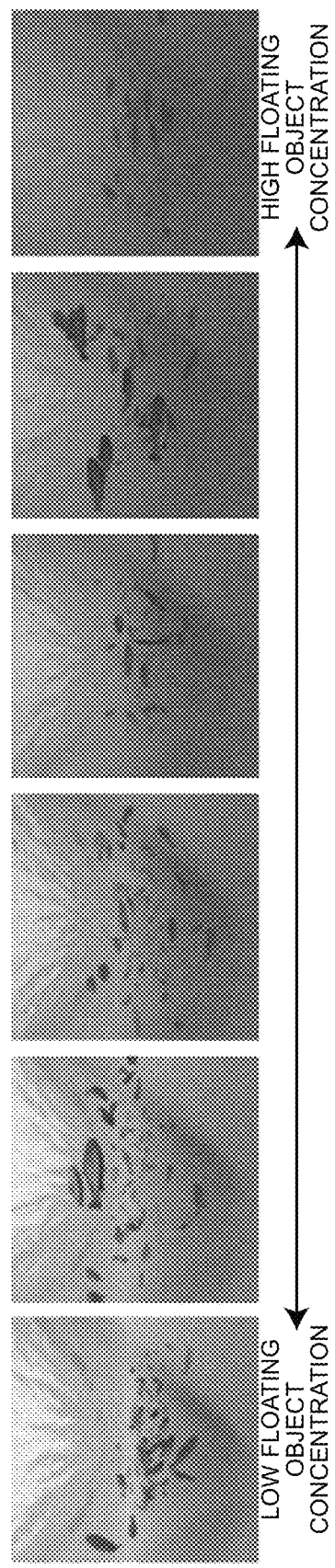
FIG. 13 is a diagram illustrating an example of a simulation image in which a parameter indicating concentration of a floating object is changed according to the first embodiment.

FIG. 13 is a diagram illustrating an example of a simulation image in which a parameter indicating concentration of a floating object is changed according to the first embodiment. The six images illustrated in FIG. 13 are simulation images in which the concentration of the floating object is lower toward the left and the concentration of the floating object is higher toward the right. The floating object is soil on the sea floor that has been rolled up, eggs of shellfish or jellyfish, dust, or the like. The floating object causes turbidity of water. Therefore, it is known that water having a high concentration of the floating object looks cloudy. Therefore, the generation unit 152 generates the simulation image on the basis of the concentration of the floating object in the water in the cage in which each fish belonging to the herd of fish is located as the value of the color parameter. Specifically, the generation unit 152 generates the simulation image by controlling the luminance value of each pixel of the simulation image such that the luminance value of each pixel of the simulation image decreases as the concentration of the floating object in the water in the cage increases.

Figure 14:
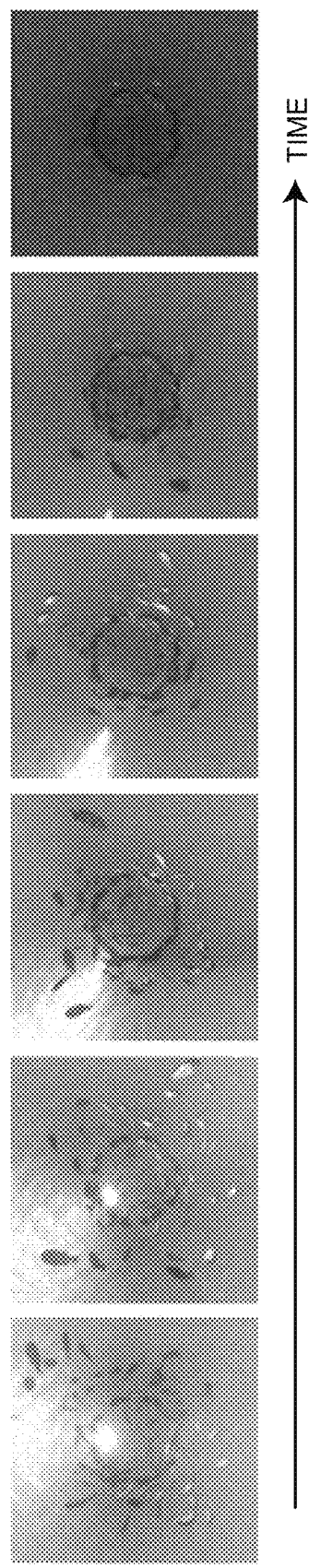
FIG. 14 is a diagram illustrating an example of a simulation image in which parameters indicating the intensity of sunlight and the depth of the cage from the water surface are changed according to the first embodiment.

FIG. 14 is a diagram illustrating an example of a simulation image in which parameters indicating the intensity of sunlight and the depth of the cage from the water surface are changed according to the first embodiment. The six images illustrated in FIG. 14 are simulation images in which the intensity of sunlight is changed between noon and 18:00. In FIG. 14, since the simulation image at the left end is captured at noon, the intensity of sunlight is strong, and the water in the cage looks bright. On the other hand, in the simulation image at the right end, since it has passed sunset, the intensity of sunlight is low, and the water in the cage appears dark. In general, it is known that the absorbance of light incident on a dilute solution such as seawater is proportional to the concentration of the dilute solution and the length of the optical path (Lambert-Beer law). Here, when the intensity of light before entering the dilute solution is denoted by $I_0$ and the intensity of light after passing through the dilute solution is denoted by I, $I/I_0=T$ is referred to as transmittance. "$-\log T=E$", which is a negative value of the common logarithm of the transmittance T, is referred to as absorbance. The intensity of sunlight illuminating the water in the cage and the depth of the cage from the water surface change according to the latitude and longitude indicating the position of the cage and the date and time. That is, the color of seawater in the cage varies depending on the intensity of sunlight illuminating the water in the cage and the depth of the cage from the water surface and the depth of the cage from the water surface. Therefore, the generation unit 152 generates the simulation image on the basis of the intensity of sunlight illuminating the water in the cage in which each fish belonging to the herd of fish is located and the depth of the cage from the water surface as the value of the color parameter. Specifically, the generation unit 152 controls the luminance value in each pixel of the simulation image according to the Lambert-Beer law to generate the simulation image.

Figure 15:
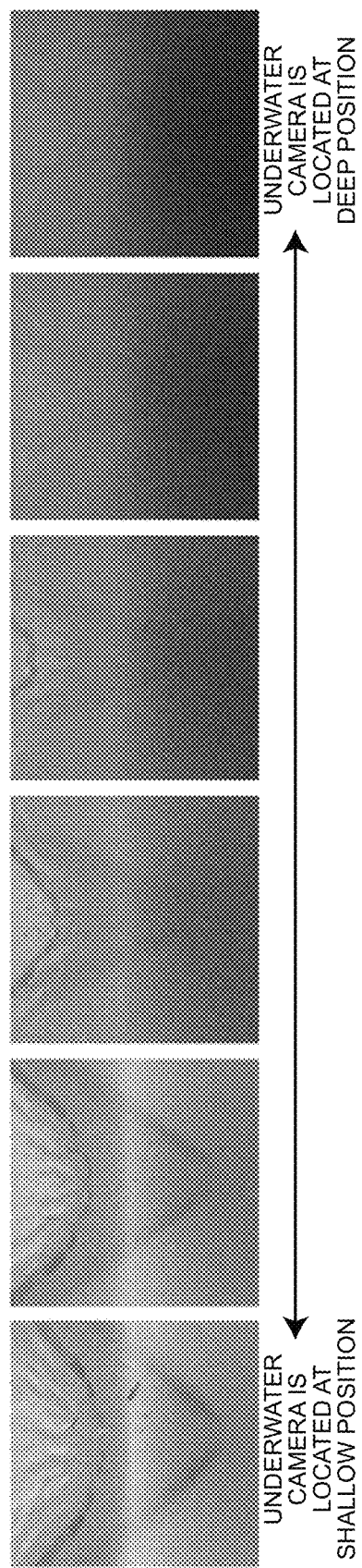
FIG. 15 is a diagram illustrating an example of a simulation image in which a parameter indicating a distance from a water surface to a depth of a position of a virtual camera is changed according to the first embodiment.

FIG. 15 is a diagram illustrating an example of a simulation image in which a parameter indicating the distance from the water surface to the depth of the position of the virtual camera is changed according to the first embodiment. The six images illustrated in FIG. 15 are simulation images in which the position of the virtual camera is shallower toward the left and the position of the virtual camera is deeper toward the right. In general, it is known that the deeper the water surface, the more light is absorbed, so that the color of water becomes darker. Therefore, the generation unit 152 generates the simulation image on the basis of the distance from the water surface of the cage in which each fish belonging to the herd of fish is located to the depth of the position of the virtual camera as the value of the color parameter. Specifically, the generation unit 152 generates the simulation image by controlling the luminance value of each pixel of the simulation image such that the larger the distance from the water surface of the cage to the depth of the position of the virtual camera, the smaller the luminance value of each pixel of the simulation image.

Figure 16:
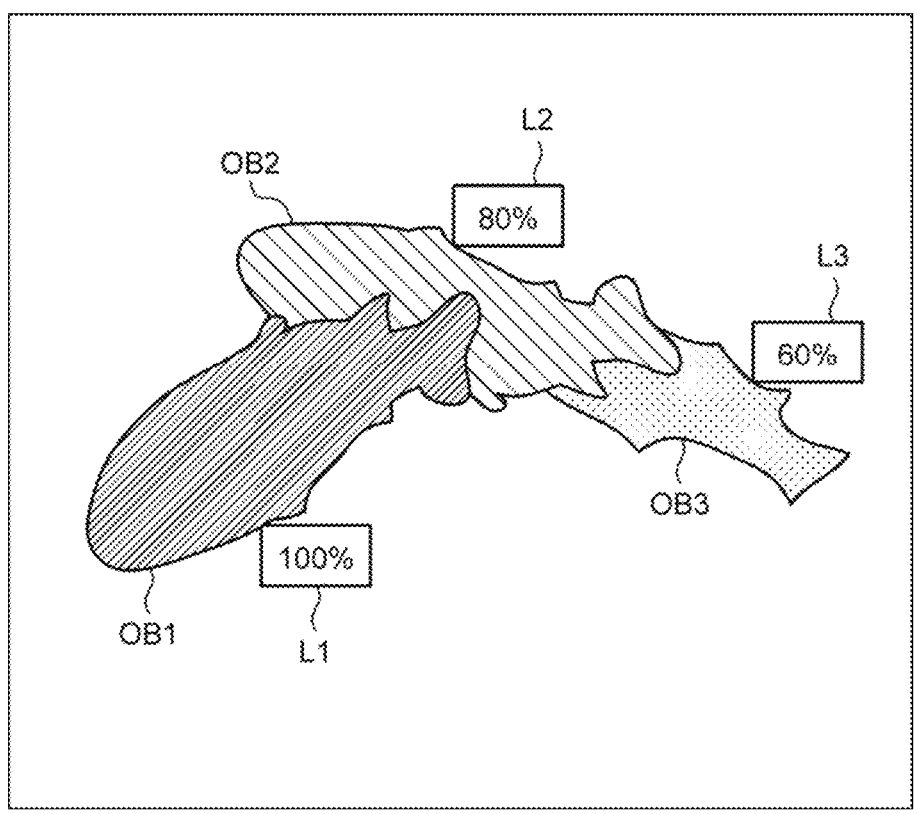
FIG. 16 is a diagram illustrating an example of training data including a label indicating an overlapping degree of each fish included in the simulation image according to the first embodiment.

FIG. 16 is a diagram illustrating an example of training data including a label indicating the degree of overlap of each fish included in the simulation image according to the first embodiment. In FIG. 16, each fish included in the simulation image is replaced with a silhouette. In FIG. 16, the acquisition unit 151 acquires a two-dimensional simulation image obtained by capturing, with a virtual camera, a three-dimensional CG of a plurality of fish swimming in a three-dimensional simulation space imitating a cage.

The generation unit 152 generates a simulation image that visually displays information indicating the degree of overlap of a plurality of fish in a two-dimensional simulation image obtained by capturing the plurality of fish located in the three-dimensional simulation space with the virtual camera. Specifically, the generation unit 152 determines, on the basis of the simulation image acquired by the acquisition unit 151, whether or not there is a fish that appears to overlap in the image among a plurality of fish included in the simulation image. For example, the generation unit 152 determines whether or not there is a fish that appears to overlap in the image when viewed from the position of the virtual camera on the basis of the position coordinates of each of the plurality of fish located in the three-dimensional simulation space and the position coordinates of the virtual camera. In FIG. 16, the generation unit 152 determines that three fish OB1 to OB3 included in the simulation image appear to overlap in the image.

Subsequently, the generation unit 152 calculates information indicating the degree of overlap of the plurality of fish in the simulation image on the basis of the position coordinates of each of the plurality of fish located in the three-dimensional simulation space and the position coordinates of the virtual camera. For example, the generation unit 152 calculates the proportion of the area of the visually recognizable region of each of the plurality of fish as the information indicating the degree of overlap. In FIG. 16, since the entire body of the fish OB1 located in the foremost surface can be visually recognized, the generation unit 152 calculates the proportion of the area of the visually recognizable region as 100%. In addition, the generation unit 152 calculates the proportion of an area of a region in which the fish OB2 located behind the fish OB1 is hidden by the fish OB1 located in front and cannot be visually recognized as 20% and the proportion of an area of a visually recognizable region as 80%. In addition, the generation unit 152 calculates the proportion of the area in which the fish OB3 located on the last surface (the fish OB3 located behind the fish OB2) is hidden by the fish OB2 located in front and cannot be visually recognized as 40% and the proportion of an area of a visually recognizable region as 60%.

Subsequently, when calculating the information indicating the degree of overlap, the generation unit 152 visualizes the information indicating the degree of overlap and adds the visualized information to the simulation image. For example, the generation unit 152 displays a label indicating the proportion of the area of the visually recognizable region of each of the plurality of fish at a position within a predetermined range from each fish. In FIG. 16, the generation unit 152 displays a label L1 including characters "100%" indicating the proportion of the area of the visually recognizable region of the fish OB1 at a position within a predetermined range from the fish OB1. In addition, the generation unit 152 displays a label L2 including characters of "80%" indicating the proportion of the area of the visually recognizable region of the fish OB2 at a position within a predetermined range from the fish OB2. In addition, the generation unit 152 displays a label L3 including characters "60%" indicating the proportion of the area of the visually recognizable region of the fish OB3 at a position within a predetermined range from the fish OB3.

Figure 17:
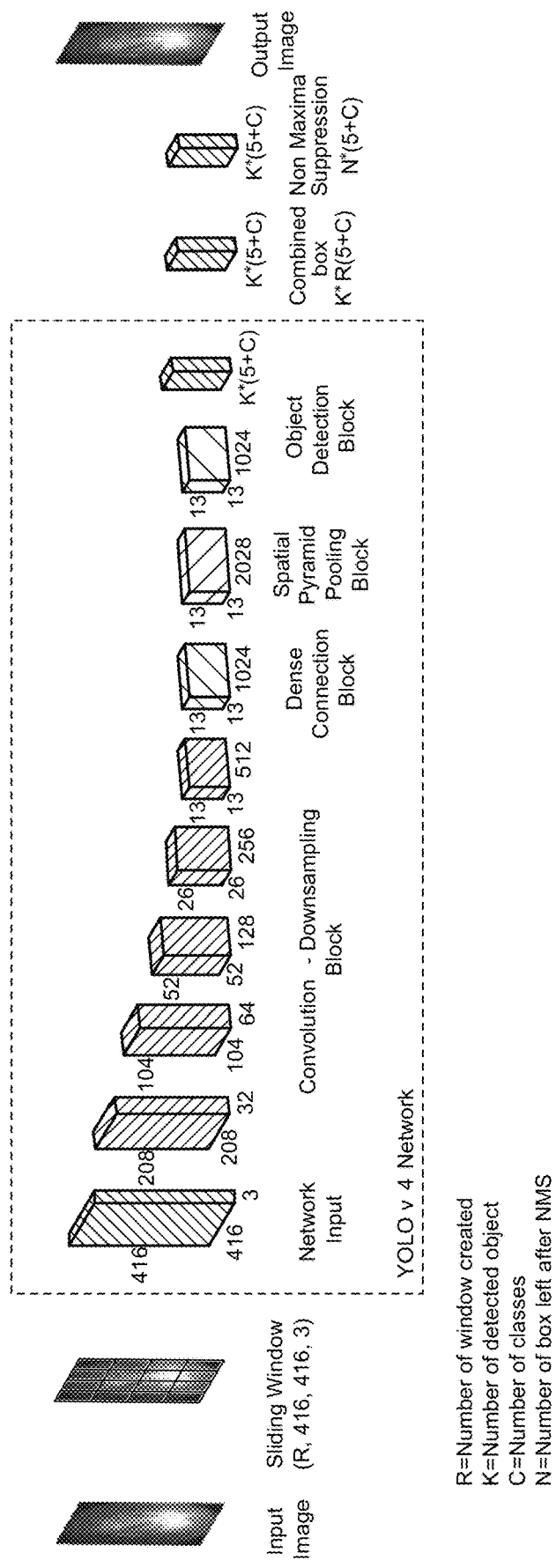
FIG. 17 is a diagram illustrating an example of a machine learning model according to the first embodiment.

FIG. 17 is a diagram illustrating an example of a machine learning model according to the first embodiment. The machine learning model illustrated in FIG. 17 includes a neural network of You Only Look Once (YOLO). When inputting the simulation image to the machine learning model, the generation unit 152 causes the machine learning model to learn so as to output individual identification information of each fish included in the simulation image and information (for example, the number of fish) corresponding to the individual identification information of each fish. Note that the generation unit 152 may apply any known neural network used for object detection to the machine learning model, not limited to YOLO. For example, in addition to YOLO, the generation unit 152 can apply Faster R-CNN developed for object detection or a single shot multibox detector (SSD) to the machine learning model.

For example, in a case where the generated simulation image is input to the machine learning model M1, the generation unit 152 causes a machine learning model M1 to learn so as to output the simulation image on which the three-dimensional bounding box indicating the position information of each individually identified fish is superimposed and displayed and the number of individually identified fish (the number of fish in a herd).

In addition, in a case where the generated simulation image is input to a machine learning model M2, the generation unit 152 causes the machine learning model M2 to learn so as to output the simulation image on which the two-dimensional bounding box indicating the size of each individually identified fish is superimposed and displayed and the number of individually identified fish (the number of fish in a herd).

In addition, in a case where the generated simulation image is input to a machine learning model M3, the generation unit 152 causes the machine learning model M3 to learn so as to output a simulation image in which each individually identified fish is replaced with a silhouette and the number of individually identified fish (the number of fish in a herd).

In addition, in a case where the generated simulation image is input to each of the machine learning models M1 to M3, the generation unit 152 causes each of the machine learning models M1 to M3 to learn so as to output a simulation image in which information visualizing information indicating the degree of overlap of a plurality of fish in the simulation image is displayed in a superimposed manner. For example, in a case where the generated simulation image is input to each of the machine learning models M1 to M3, the generation unit 152 causes each of the machine learning models M1 to M3 to learn so as to output each of the simulation images on which a label indicating the proportion of the area of the visually recognizable region of each of the plurality of fish in the simulation image is superimposed and displayed.

As described above, in a case where the generated simulation image is input to the machine learning model, the generation unit 152 causes the machine learning model to learn so as to output correct answer data generated on the basis of the parameter information used to generate the simulation image or information corresponding to the correct answer data.

Estimation Unit 153

The estimation unit 153 estimates information on a plurality of targets included in a captured image from the captured image obtained by capturing the plurality of targets using the learned machine learning model generated by the generation unit 152. For example, the estimation unit 153 estimates the information regarding the herd of fish included in the captured image from the captured image obtained by capturing the herd of fish using the learned machine learning model generated by the generation unit 152.

Furthermore, the estimation unit 153 estimates the number of a plurality of targets included in the captured image as information regarding the plurality of targets. For example, the estimation unit 153 inputs the captured image to the learned machine learning model M2 generated by the generation unit 152. Subsequently, the estimation unit 153 outputs, from the machine learning model M2, the captured image on which the two-dimensional bounding box and the label indicating the proportion of the area of the visually recognizable region of each of the plurality of fish in the captured image are displayed in a superimposed manner, and the number of individually identified fish (the number of fish in a herd). The estimation unit 153 sets the information output from the machine learning model M2 as an estimation result.

Output Control Unit 154

Figure 18:
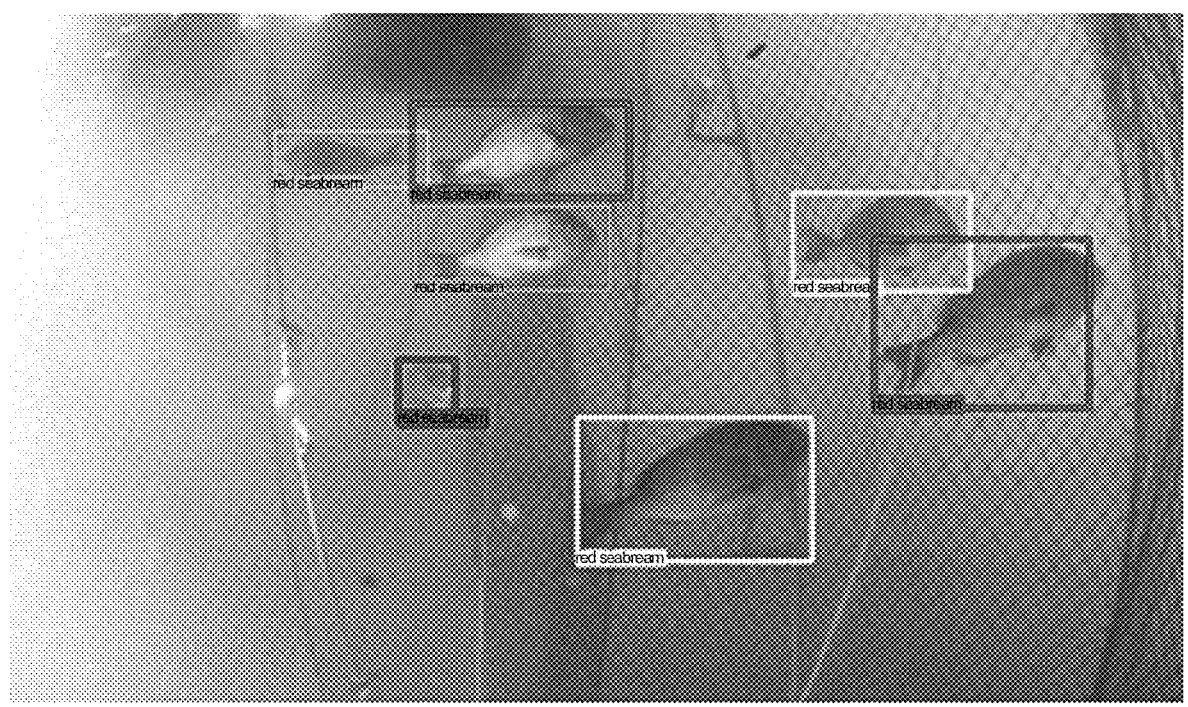
FIG. 18 is a diagram illustrating an example of a screen on which an estimation result of a captured image is output.
Figure 19:
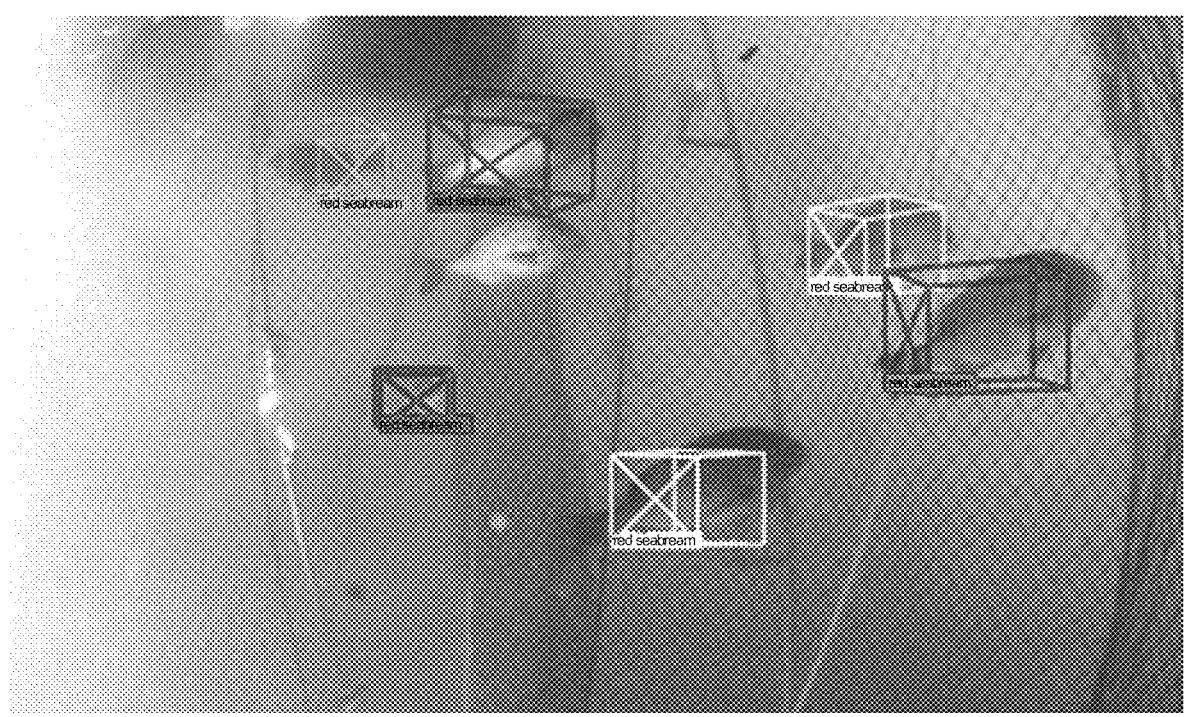
FIG. 19 is a diagram illustrating an example of a screen on which an estimation result of a captured image is output.
Figure 20:
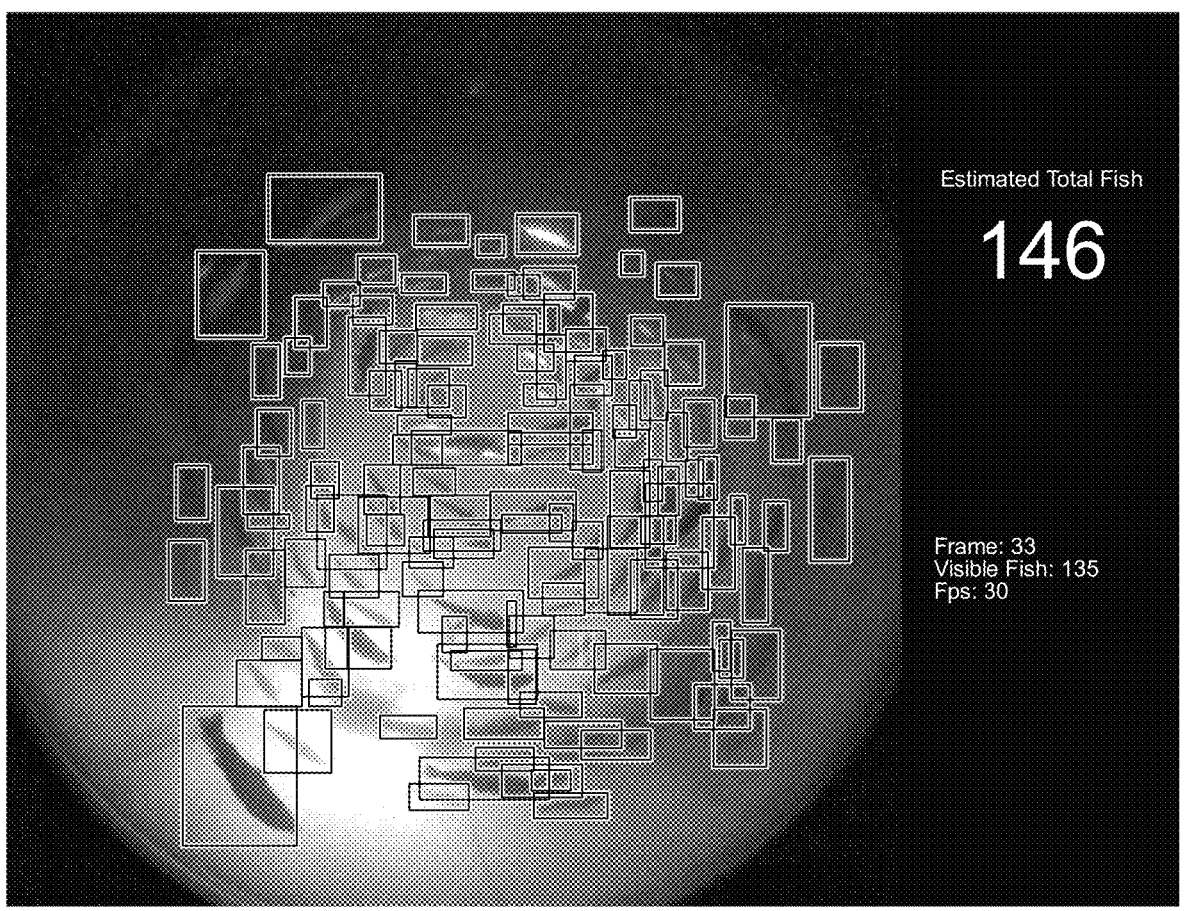
FIG. 20 is a diagram illustrating an example of a screen on which an estimation result of a captured image is output.

The output control unit 154 performs control to display the estimation result estimated by the estimation unit 153 on the screen. FIGS. 18 to 20 is a diagram illustrating an example of a screen on which the estimation result of the captured image is output.

In the example illustrated in FIG. 18, the output control unit 154 displays, on the screen, a captured image on which a two-dimensional bounding box surrounding each fish detected from the captured image and a label indicating the type of each detected fish are displayed in a superimposed manner, as the estimation result estimated by the estimation unit 153. Note that the output control unit 154 may display, on the screen, a captured image on which a label indicating the proportion of the area of the visually recognizable region of each detected fish is further superimposed as the estimation result estimated by the estimation unit 153.

In the example illustrated in FIG. 19, the output control unit 154 displays, on the screen, a captured image on which a three-dimensional bounding box surrounding each fish detected from the captured image and a label indicating the type of each detected fish are displayed in a superimposed manner, as the estimation result estimated by the estimation unit 153. Note that the output control unit 154 may display, on the screen, a captured image on which a label indicating the proportion of the area of the visually recognizable region of each detected fish is further superimposed as the estimation result estimated by the estimation unit 153.

In the example illustrated in FIG. 20, the output control unit 154 causes the screen to display, as the estimation result estimated by the estimation unit 153, the captured image to which the two-dimensional bounding box has been added and "146" which is the number of fish (the number of fish in a herd) that have been individually identified.

Note that, in the first embodiment described above, the case where the object included in the simulation image is a fish and the plurality of objects is a plurality of fish included in a herd of fish has been described, but the object in the simulation image is not limited to fish. For example, the object in the simulation image may be a person, an animal, a vehicle, or the like in addition to a fish. Furthermore, the information processing apparatus 100 may generate a simulation image that visually displays information indicating the degree of overlap of a plurality of objects in a two-dimensional simulation image obtained by capturing the plurality of objects (for example, a plurality of persons, a plurality of animals, a plurality of vehicles, or the like) located in the three-dimensional simulation space with the virtual camera.

2. Second Embodiment 2-1. Introduction

In the first embodiment described above, the case where the information processing apparatus 100 generates a simulation image in which a herd of fish located in a three-dimensional simulation space is captured by a virtual camera instead of a captured image in which a herd of fish existing in a three-dimensional space (for example, in the cage) is captured has been described. However, there is room for improvement in a technique for generating a group behavior of fish included in a simulation image. Therefore, in the second embodiment, an information processing apparatus 100A performs reinforcement learning or deep reinforcement learning on a machine learning model that determines a group behavior of fish arranged in a three-dimensional simulation space (hereinafter, the three-dimensional simulation space is also referred to as a virtual space). Then, a case where the information processing apparatus 100A determines a group behavior of fish using a machine learning model subjected to reinforcement learning or deep reinforcement learning will be described.

2-2. Configuration of Information Processing Apparatus

Figure 21:
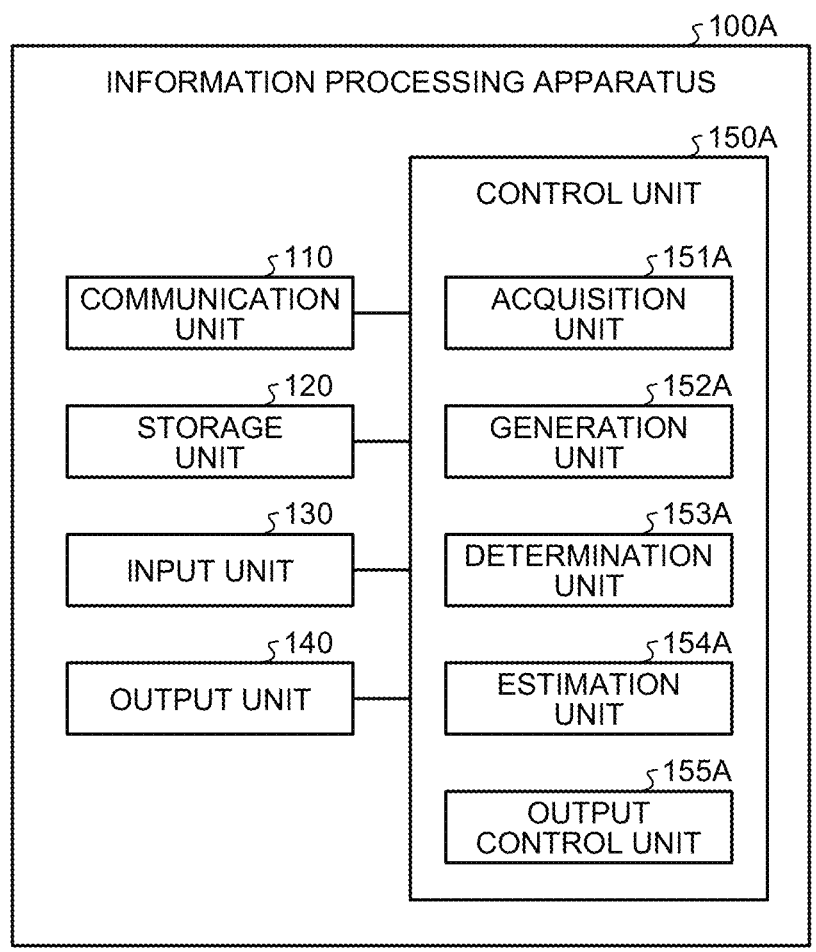
FIG. 21 is a diagram illustrating a configuration example of an information processing apparatus according to a second embodiment.

FIG. 21 is a diagram illustrating a configuration example of the information processing apparatus 100A according to the second embodiment. The information processing apparatus 100A includes a communication unit 110, a storage unit 120, an input unit 130, an output unit 140, and a control unit 150A. Note that, in the information processing apparatus 100A, description of points similar to those of the information processing apparatus 100 will be omitted as appropriate.

Control Unit 150A

The control unit 150A is a controller, and is implemented by, for example, a CPU, an MPU, a GPU, or the like executing various programs (corresponding to an example of an information processing program) stored in a storage device inside the information processing apparatus 100A using a RAM as a work area. Furthermore, the control unit 150A is a controller, and is realized by, for example, an integrated circuit such as an ASIC or an FPGA.

As illustrated in FIG. 21, the control unit 150A includes an acquisition unit 151A, a generation unit 152A, a determination unit 153A, an estimation unit 154A, and an output control unit 155A, and implements or executes a function and an action of information processing described below.

Note that the internal configuration of the control unit 150A is not limited to the configuration illustrated in FIG. 21, and may be another configuration as long as information processing to be described later is performed.

Acquisition Unit 151A

The acquisition unit 151A acquires individual information indicating characteristics of behavior of individuals belonging to a herd of fish to be processed arranged in the virtual space. Specifically, the acquisition unit 151A acquires individual information input by the user via the input unit 130. For example, the acquisition unit 151A acquires, as the individual information, information indicating the position of the individual in the virtual space, the moving speed, the moving direction, and the body length of the individual. In addition, the acquisition unit 151A acquires, as the individual information, information indicating a water temperature and illuminance preferred by the individual. In addition, the acquisition unit 151A acquires individual information of each individual belonging to a herd of fish to be processed.

In addition, the acquisition unit 151A acquires relative information indicating a characteristic of the behavior relative to individuals of other individuals located around individuals belonging to a herd of fish to be processed. Specifically, the acquisition unit 151A acquires the relative information input by the user via the input unit 130. For example, the acquisition unit 151A acquires, as the relative information, information regarding another individual located within a range of a distance (for example, a distance three times or a distance two times the body length of the subject) of a predetermined multiple of the body length of the individual from the position of the individual. In addition, the acquisition unit 151A acquires, as the relative information, information indicating a relative position and a relative speed of another individual with respect to the individual. The acquisition unit 151A acquires relative information of each individual belonging to a herd of fish to be processed.

In addition, the acquisition unit 151A acquires environment information indicating the characteristics of the environment around an individual belonging to a herd of fish to be processed. Specifically, the acquisition unit 151A acquires the environment information input by the user via the input unit 130. For example, the acquisition unit 151A acquires, as the environment information, information in a space within a range of a distance (for example, a distance three times or a distance two times the body length of the subject) of a predetermined multiple of the body length of the individual from the position of the individual. In addition, the acquisition unit 151A acquires information indicating the temperature and illuminance in the space around the individual as the environment information. The acquisition unit 151A acquires environmental information of each individual belonging to a herd of fish to be processed.

Generation Unit 152A

The generation unit 152A generates a reinforcement learning model that is a machine learning model subjected to reinforcement learning or deep reinforcement learning so as to output a behavior of an individual belonging to a herd of fish to be learned in a case where individual information indicating a behavior characteristic of an individual belonging to a herd of fish to be learned, relative information indicating a characteristic of the behavior relative to individuals of other individuals located around the individual belonging to the herd of fish to be learned, and environmental information indicating a characteristic of an environment around the individual belonging to the herd of fish to be learned are input on the basis of a reward given to the behavior of the individual belonging to the herd of fish to be learned arranged in the virtual space. Here, the deep reinforcement learning is a learning method combining deep learning and reinforcement learning such as so-called deep learning. For example, the reinforcement learning model may include a deep neural network (DNN) that is a neural network including an input layer, a plurality of intermediate layers, and an output layer, and may determine the behavior of the individual belonging to the herd of fish on the basis of information output from the output layer when the input information is input from the input layer. Specifically, the generation unit 152A causes the reinforcement learning model to learn so as to maximize the reward r represented by the following formula (1).

$$r = r^{BC} + r^{NC} + r^{BD} + r^{ND} + r^{E} + r^{M} + r^{C} \qquad (1)$$

The reward r represented by the above formula (1) includes a negative reward $r^{BC}$ given to a behavior that an individual belonging to a herd of fish to be learned collides with a boundary in the virtual space. Here, the virtual space is, for example, a three-dimensional simulation space in the first embodiment. The boundary in the virtual space includes a boundary with a wall (net) of the cage arranged in the virtual space and a boundary with a water surface of the cage.

Furthermore, the reward r includes a negative reward $r^{NC}$ given to a behavior that an individual belonging to a herd of fish to be learned collides with another individual located around the individual. For example, the negative reward $r^{NC}$ is added in proportion to the number of times the individual collides with other individuals located around the individual.

Furthermore, the reward r includes a reward $r^{BD}$ given to a behavior that an individual belonging to a herd of fish to be learned avoids a collision with a boundary in the virtual space. For example, the reward $r^{BD}$ is given to a behavior of keeping a predetermined distance from a boundary located in a sensing range in which an individual belonging to a herd of fish can detect information around the individual. Here, the range in which the individual can detect the information around the individual is, for example, within a range of a distance (for example, a distance three times or a distance two times the body length of the subject) of a predetermined multiple of the body length of the individual from the position of the individual.

Furthermore, the reward r includes a reward $r^{ND}$ given to a behavior that an individual belonging to a herd of fish to be learned is located near another individual located around the individual, and the individual aligns the orientation of the individual with the orientation of the other individual. For example, the reward $r^{ND}$ is given to a behavior that an individual belonging to a herd of fish is located near another individual located within a range in which information around the individual can be detected. In addition, the reward $r^{ND}$ is given to a behavior that an individual belonging to a herd of fish aligns the orientation of the individual with the orientation of another individual located within a range in which information around the individual can be detected.

In addition, the reward r includes a negative reward $r^{E}$ given to a behavior that an individual belonging to a herd of fish to be learned rotates. A negative reward $r^{E}$ is given for an individual's behavior of rotating his or her body. In addition, the negative reward $r^{E}$ is given to a behavior that the individual advances like a drill while rotating his/her body.

Furthermore, the reward r includes a negative reward $r^{M}$ given to a behavior that an individual belonging to a herd of fish to be learned moves at a speed exceeding the first speed (speed threshold). The negative reward $r^M$ is given to a behavior that the individual moves at a speed exceeding the first speed (speed threshold). In addition, the negative reward $r^M$ is also given to a behavior that an individual belonging to a herd of fish to be learned changes the pitch angle of the individual to an angle exceeding the first pitch angle. For example, the negative reward $r^M$ is given to a behavior that the individual rapidly changes his/her orientation with respect to the traveling direction.

Furthermore, the reward r includes a reward $r^C$ that is a reward given to a behavior that an individual belonging to a herd of fish to be learned tracks another individual located around the individual, or a negative reward given to a behavior that the individual escapes from another individual tracing the individual.

Furthermore, the generation unit 152A causes the reinforcement learning model to learn by reinforcement learning or deep reinforcement learning. For example, the generation unit 152A causes the reinforcement learning model to learn by an algorithm of proximal policy optimization (PPO) represented by the following Formula (2). $L_{CLIP}(\theta)$ in Formula (2) represents a surrogate objective function, $\pi_\theta$ represents a measure before updating, $\pi_{\theta_{old}}$ represents a measure after updating, and $l_t(\theta)$ represents a ratio between the measure $\pi_\theta$ before updating and the measure $\pi_{\theta_{old}}$ after updating.

$$L^{CLIP}(\theta) = E_{s_t,a_t}\left[\min\left(l_t(\theta)\hat{A}_t, \text{clip}\left(l_t(\theta), 1-\epsilon, 1+\epsilon\right)\hat{A}_t\right)\right] \quad (2)$$

$$l_t(\theta) = \frac{\pi_\theta(a_t|s_t)}{\pi_{\theta_{old}}(a_t|s_t)}$$

Determination Unit 153A

The determination unit 153A determines a behavior of an individual belonging to a herd of fish to be processed on the basis of the individual information, the relative information, and the environmental information acquired by the acquisition unit 151A. Specifically, the determination unit 153A determines a behavior of an individual belonging to a herd of fish to be processed using the reinforcement learning model generated by the generation unit 152A.

Furthermore, the generation unit 152A generates a simulation image including the behavior of the individual belonging to the herd of fish to be processed determined by the determination unit 153A.

In addition, in a case where the generated simulation image is input, the generation unit 152A generates an estimation model that is a machine learning model learned to output correct answer data generated on the basis of the parameter information used to generate the simulation image or information corresponding to the correct answer data.

Estimation Unit 154A

The estimation unit 154A estimates information on a herd of fish included in a captured image from the captured image obtained by capturing the herd of fish located in the real space. Specifically, the estimation unit 154A estimates information regarding a herd of fish from the captured image using the estimation model generated by the generation unit 152A.

Output Control Unit 155A

The output control unit 155A includes:

Note that, in the second embodiment described above, the case where the information processing apparatus 100A determines the behavior of the individual belonging to the herd of fish has been described. However, the information processing apparatus 100A may determine the behavior of the individual belonging to the group of living organisms that act in groups other than fish. For example, the information processing apparatus 100A may determine the behavior of an individual belonging to a group of living organisms that are birds, bats, elephants, deer, humans, or virtual living organisms (three-dimensional CG of fish, characters, or the like).

Furthermore, in the second embodiment described above, the case where the information processing apparatus 100A generates the simulation image including the behavior of the individual belonging to the herd of fish determined by the determination unit 153A has been described, but the application example of the behavior of the individual belonging to the herd of fish determined by the determination unit 153A is not limited to the image. For example, the information processing apparatus 100A may cause the biological robot located in the real space to output the behavior of the individual belonging to the group of living organisms determined by the determination unit 153A. For example, the information processing apparatus 100A may cause a fish-shaped robot located in a water tank in the real space to output the behavior of the individual belonging to the herd of fish determined by the determination unit 153A.

3. Effects

As described above, the information processing apparatus 100A according to the second embodiment includes the acquisition unit 151A and the determination unit 153A. The acquisition unit 151A acquires individual information indicating characteristics of behavior of an individual belonging to a group of living organisms to be processed arranged in the virtual space, relative information indicating characteristics of behavior relative to individuals of other individuals located around the individual belonging to the group of living organisms to be processed, and environmental information indicating characteristics of environment around the individual belonging to the group of living organisms to be processed. The determination unit 153A determines the behavior of an individual belonging to a group of living organisms to be processed on the basis of the individual information, the relative information, and the environmental information acquired by the acquisition unit 151A.

As a result, the information processing apparatus 100A can automatically generate the behavior of each individual belonging to the group of living organisms. Therefore, the information processing apparatus 100A can automatically generate the group behavior of the living organism. In addition, since the information processing apparatus 100A can automatically generate the group behavior of living organisms, it can contribute to the achievement of the goal 9 of the sustainable development goal (SDGs) "Make the basis for industry and technological innovation". Furthermore, since the information processing apparatus 100A can automatically generate the group behavior of the living organism, it is possible to automatically generate the simulation image including the group behavior of the living organism. Furthermore, the information processing apparatus 100A can cause a machine learning model to learn, using the generated simulation image including the group behavior of the living organism, the machine learning model estimating information regarding the group behavior of the living organism included in the image from the image. As a result, the information processing apparatus 100A can improve the estimation accuracy of the machine learning model that estimates the information regarding the group behavior of the living organism included in the image from the image. Furthermore, the information processing apparatus 100A can improve estimation accuracy of a machine learning model that estimates information regarding a group behavior of fish included in an image from the image, for example, and thus can contribute to achievement of the goal 14 of the sustainable development goal (SDGs) "preserve the richness of the sea".

Furthermore, the information processing apparatus 100A further includes a generation unit 152A. On the basis of the reward given to the behavior of the individual belonging to the group of living organisms to be learned arranged in the virtual space, the generation unit 152A generates a reinforcement learning model that is a machine learning model subjected to reinforcement learning so as to output the behavior of the individual belonging to the group of living organisms to be learned in a case where the individual information indicating the characteristic of the behavior of the individual belonging to the group of living organisms to be learned, the relative information indicating the characteristic of the behavior relative to the individuals of other individuals located around the individual belonging to the group of living organisms to be learned, and the environmental information indicating the characteristic of the environment around the individual belonging to the group of living organisms to be learned are input. The determination unit 153A determines a behavior of an individual belonging to a group of living organisms to be processed using the reinforcement learning model generated by the generation unit 152A.

As a result, the information processing apparatus 100A can appropriately determine the behavior of the individual belonging to the group of living organisms by using the reinforcement learning model.

Furthermore, the reward includes a negative reward given to a behavior that an individual belonging to a group of living organisms to be learned collides with a boundary in the virtual space.

As a result, the information processing apparatus 100A can cause the reinforcement learning model to learn so that an individual belonging to a group of living organisms refrains from a behavior of colliding with a boundary in the virtual space.

Furthermore, the reward includes a negative reward given to a behavior that an individual belonging to a group of living organisms to be learned collides with another individual located around the individual.

As a result, the information processing apparatus 100A can cause the reinforcement learning model to learn so that an individual belonging to a group of living organisms refrains from a behavior of colliding with another individual located around the individual.

Furthermore, the reward includes a reward given to a behavior that an individual belonging to a group of living organisms to be learned avoids a collision with a boundary in the virtual space.

As a result, the information processing apparatus 100A can cause the reinforcement learning model to learn such that an individual belonging to a group of living organisms can easily take a behavior to avoid a collision with a boundary in the virtual space.

Furthermore, the reward includes a reward given to a behavior that an individual belonging to a group of living organisms to be learned is located near another individual located around the individual, and the individual aligns the orientation of the individual with the orientation of the other individual.

As a result, the information processing apparatus 100A can cause the reinforcement learning model to learn such that an individual belonging to a group of living organisms is located near another individual located around the individual, and the individual takes a behavior of aligning the orientation of the individual with the orientation of the other individual.

In addition, the reward includes a negative reward given to a behavior that an individual belonging to a group of living organisms to be learned rotates.

As a result, the information processing apparatus 100A can cause the reinforcement learning model to learn so that a behavior that the individual belonging to the group of living organisms rotates is refrained.

In addition, the reward includes a negative reward given to a behavior that an individual belonging to a group of living organisms to be learned moves at a speed exceeding the first speed.

As a result, the information processing apparatus 100A can cause the reinforcement learning model to learn so that an individual belonging to a group of living organisms refrains from a behavior of moving at a speed exceeding the first speed.

In addition, the reward includes a negative reward given to a behavior that an individual belonging to the group of living organisms to be learned changes the pitch angle of the individual to an angle exceeding the first pitch angle.

As a result, the information processing apparatus 100A can cause the reinforcement learning model to learn so that the individual belonging to the group of living organisms refrains from a behavior of changing the pitch angle of the individual to an angle exceeding the first pitch angle.

Furthermore, the reward includes a reward given to a behavior that an individual belonging to a group of living organisms to be learned tracks another individual located around the individual, and a negative reward given to a behavior that the individual escapes from another individual tracing the individual.

As a result, the information processing apparatus 100A can cause the reinforcement learning model to learn such that an individual belonging to a group of living organisms can easily take a behavior of tracking another individual located around the individual. Furthermore, the information processing apparatus 100A can cause the reinforcement learning model to learn so that the individual refrains from behavior of escaping from another individual who tracks the individual.

In addition, the individual information includes information indicating the position of the individual in the virtual space, the moving speed, the moving direction, and the body length of the individual.

As a result, the information processing apparatus 100A can appropriately determine the behavior of the individual belonging to the group of living organisms on the basis of the position of the individual, the moving speed, the moving direction, and the body length of the individual.

In addition, the individual information includes information indicating water temperature and illuminance preferred by the individual.

As a result, the information processing apparatus 100A can appropriately determine the behavior of the individual belonging to the group of living organisms on the basis of the water temperature and the illuminance preferred by the individual.

Furthermore, the relative information is information regarding another individual located within a range of a distance of a predetermined multiple of the body length of the individual from the position of the individual.

As a result, the information processing apparatus 100A can appropriately determine the behavior of the individual belonging to the group of living organisms on the basis of the range in which the individual can detect the information around the individual.

Furthermore, the relative information includes information indicating a relative position and a relative speed of another individual with respect to the individual.

As a result, the information processing apparatus 100A can appropriately determine the behavior of the individual belonging to the group of living organisms on the basis of the relative position and the relative speed of another individual with respect to the individual.

In addition, the environmental information is information in a space within a range of a distance of a predetermined multiple of the body length of the individual from the position of the individual.

As a result, the information processing apparatus 100A can appropriately determine the behavior of the individual belonging to the group of living organisms on the basis of the range in which the individual can detect the information around the individual.

Further, the environmental information includes information indicating a temperature and illuminance in a space around the individual.

As a result, the information processing apparatus 100A can appropriately determine the behavior of the individual belonging to the group of living organisms on the basis of the temperature and the illuminance in the space around the individual.

In addition, the generation unit 152A generates a simulation image including the behavior of individuals belonging to the group of living organisms to be processed determined by the determination unit 153A.

As a result, the information processing apparatus 100A can automatically generate the simulation image including the group behavior of the living organism.

Furthermore, the information processing apparatus 100A further includes an estimation unit 154A. The estimation unit 154A estimates information on a group of living organisms included in a captured image from the captured image obtained by capturing the group of living organisms existing in the real space. When the simulation image is input, the generation unit 152A generates an estimation model that is a machine learning model learned to output correct answer data generated on the basis of the parameter information used to generate the simulation image or information corresponding to the correct answer data. The estimation unit 154A estimates information on a group of living organisms from the captured image using the estimation model.

As a result, the information processing apparatus 100A can cause a machine learning model to learn, by using the simulation image including the group behavior of the living organism generated by the information processing apparatus 100A, the information regarding the group behavior of the living organism included in the image from the image. As a result, the information processing apparatus 100A can improve the estimation accuracy of the machine learning model that estimates the information regarding the group behavior of the living organism included in the image from the image.

The living organism is a fish.

As a result, the information processing apparatus 100A can automatically generate a group behavior of fish.

4. Hardware Configuration

Figure 22:
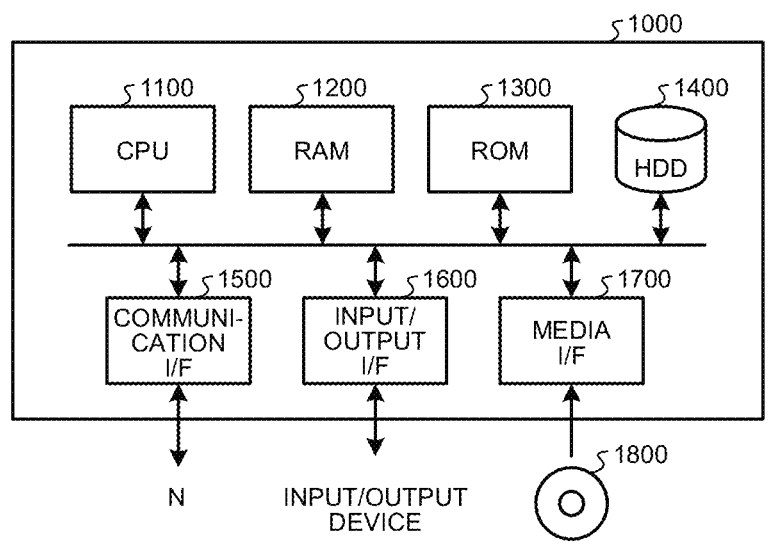
FIG. 22 is a hardware configuration diagram illustrating an example of a computer that implements the functions of the information processing apparatus.

Furthermore, the information processing apparatus such as the information processing apparatus 100 according to the first embodiment and the information processing apparatus 100A according to the second embodiment described above is implemented by a computer 1000 having a configuration as illustrated in FIG. 22, for example. FIG. 22 is a hardware configuration diagram illustrating an example of a computer that implements the functions of the information processing apparatus such as the information processing apparatus 100 and the information processing apparatus 100A. Hereinafter, an information processing apparatus 100A according to the second embodiment will be described as an example. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400, and controls each unit. The ROM 1300 stores a boot program executed by the CPU 1100 when the computer 1000 is activated, a program depending on hardware of the computer 1000, and the like.

The HDD 1400 stores a program executed by the CPU 1100, data used by the program, and the like. The communication interface 1500 receives data from another device via a predetermined communication network, sends the data to the CPU 1100, and transmits data generated by the CPU 1100 to another device via a predetermined communication network.

The CPU 1100 controls an output device such as a display or a printer and an input device such as a keyboard or a mouse via the input/output interface 1600. The CPU 1100 acquires data from the input device via the input/output interface 1600. In addition, the CPU 1100 outputs the generated data to the output device via the input/output interface 1600.

The media interface 1700 reads a program or data stored in the recording medium 1800 and provides the program or data to the CPU 1100 via the RAM 1200. The CPU 1100 loads the program from the recording medium 1800 onto the RAM 1200 via the media interface 1700, and executes the loaded program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 100A according to the second embodiment, the CPU 1100 of the computer 1000 realizes the function of the control unit 150A by executing a program loaded on the RAM 1200. The CPU 1100 of the computer 1000 reads and executes these programs from the recording medium 1800, but as another example, these programs may be acquired from another device via a predetermined communication network.

Although some of the embodiments of the present application have been described in detail with reference to the drawings, these are merely examples, and the present invention can be implemented in other forms subjected to various modifications and improvements based on the knowledge of those skilled in the art, including the aspects described in the disclosure of the invention.

5. Others

In addition, among the processes described in the above embodiment and modifications, all or a part of the processes described as being automatically performed can be manually performed, or all or a part of the processes described as being manually performed can be automatically performed by a known method. In addition, the processing procedure, specific name, and information including various data and parameters illustrated in the document and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the above-described embodiments and modifications can be appropriately combined within a range that does not contradict processing contents.

According to an aspect of the embodiment, it is possible to automatically generate a group behavior of living organisms.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an acquisition circuit configured to acquire individual information indicating a characteristic of behavior of an individual belonging to a group of living organisms to be processed arranged in a virtual space, relative information indicating a characteristic of relative behavior of another individual located around the individual belonging to the group of living organisms to be processed with respect to the individual, and environmental information indicating a characteristic of an environment around the individual belonging to the group of living organisms to be processed;
a determination circuit configured to determine a behavior of an individual belonging to the group of living organisms to be processed on the basis of the individual information, the relative information, and the environmental information acquired by the acquisition circuit; and
a generation circuit configured to generate a reinforcement learning model that is a machine learning model subjected to reinforcement learning so as to output a behavior of an individual belonging to a group of living organisms to be learned in a case where individual information indicating a characteristic of a behavior of an individual belonging to the group of living organisms to be learned arranged in a virtual space, relative information indicating a characteristic of a relative behavior with respect to the individual of another individual located around the individual belonging to the group of living organisms to be learned, and environmental information indicating a characteristic of an environment around the individual belonging to the group of living organisms to be learned are input, on the basis of a reward given to the behavior of the individual belonging to the group of living organisms to be learned, wherein
the determination circuit is further configured to determine a behavior of an individual belonging to the group of living organisms to be processed using the reinforcement learning model generated by the generation circuit, and
the information processing apparatus has a feature of one of (a) to (h):
(a) the reward includes a negative reward given to a behavior that an individual belonging to the group of living organisms to be learned collides with a boundary in the virtual space;
(b) the reward includes a negative reward given to a behavior that an individual belonging to the group of living organisms to be learned collides with another individual located around the individual;
(c) the reward includes a reward given to a behavior that an individual belonging to the group of living organisms to be learned avoids a collision with a boundary in the virtual space;
(d) the reward includes a reward given to a behavior that an individual belonging to the group of living organisms to be learned is located near another individual located around the individual, and the individual aligns an orientation of the individual with an orientation of the other individual;
(e) the reward includes a negative reward given to a behavior that an individual belonging to the group of living organisms to be learned rotates;
(f) the reward includes a negative reward given to a behavior that an individual belonging to the group of living organisms to be learned moves at a speed exceeding a first speed;
(g) the reward includes a negative reward given to a behavior that an individual belonging to the group of living organisms to be learned changes a pitch angle of the individual to an angle exceeding a first pitch angle; and
(h) the reward includes a reward given to a behavior that an individual belonging to the group of living organisms to be learned tracks another individual located around the individual, and a negative reward given to a behavior that the individual escapes from the other individual tracking the individual.

2. The information processing apparatus according to claim 1, wherein
the individual information includes information indicating a position of the individual in the virtual space, and a moving speed, a moving direction, and a body length of the individual.

3. The information processing apparatus according to claim 1, wherein
the individual information includes information indicating a water temperature and illuminance preferred by the individual.

4. The information processing apparatus according to claim 1, wherein
the relative information includes information indicating a relative position and a relative speed of the other individual with respect to the individual.

5. The information processing apparatus according to claim 1, wherein
the environment information includes information indicating a temperature and illuminance in a space around the individual.

6. The information processing apparatus according to claim 1, further comprising:
the generation circuit is further configured to generate a simulation image including a behavior of an individual belonging to the group of living organisms to be processed determined by the determination circuit.

7. The information processing apparatus according to claim 6, further comprising:
an estimation circuit configured to estimate information on a group of living organisms included in a captured image obtained by capturing the group of living organisms existing in a real space from the captured image, wherein
the generation circuit is further configured to
generate an estimation model that is a machine learning model learned to output correct answer data generated on the basis of parameter information used to generate the simulation image or information corresponding to the correct answer data when the simulation image is input, and
the estimation circuit is further configured to
estimate information on the group of living organisms from the captured image using the estimation model.

8. The information processing apparatus according to claim 1, wherein
the living organism is a fish.

9. An information processing apparatus comprising:
an acquisition circuit configured to acquire individual information indicating a characteristic of behavior of an individual belonging to a group of living organisms to be processed arranged in a virtual space, relative information indicating a characteristic of relative behavior of another individual located around the individual belonging to the group of living organisms to be processed with respect to the individual, and environmental information indicating a characteristic of an environment around the individual belonging to the group of living organisms to be processed; and
a determination circuit configured to determine a behavior of an individual belonging to the group of living organisms to be processed on the basis of the individual information, the relative information, and the environmental information acquired by the acquisition circuit, wherein
the relative information is information on the other individual located within a range of a distance of a predetermined multiple of the body length of the individual from the position of the individual.

10. An information processing apparatus comprising:
an acquisition circuit configured to acquire individual information indicating a characteristic of behavior of an individual belonging to a group of living organisms to be processed arranged in a virtual space, relative information indicating a characteristic of relative behavior of another individual located around the individual belonging to the group of living organisms to be processed with respect to the individual, and environmental information indicating a characteristic of an environment around the individual belonging to the group of living organisms to be processed; and
a determination circuit configured to determine a behavior of an individual belonging to the group of living organisms to be processed on the basis of the individual information, the relative information, and the environmental information acquired by the acquisition circuit, wherein
the environment information is information in a space within a range of a distance of a predetermined multiple of the body length of the individual from the position of the individual.

* * * * *